US012711830B1

(12) United States Patent
Laspia, III

(10) Patent No.: US 12,711,830 B1
(45) Date of Patent: Aug. 18, 2026

(54) DYNAMIC SHELVING FOR AUTOMATED FROZEN FOOD KIOSK SYSTEM

(71) Applicant: Kiosk Operators, Dallas, TX (US)

(72) Inventor: John Laspia, III, Dallas, TX (US)

(73) Assignee: Kiosk Operators, LLC, Dallas, TX (US)

( * ) Notice: Subject to any disclaimer, the term of this patent is extended or adjusted under 35 U.S.C. 154(b) by 0 days.

(21) Appl. No.: 19/355,987

(22) Filed: Oct. 10, 2025

Related U.S. Application Data

(60) Provisional application No. 63/811,160, filed on May 23, 2025, provisional application No. 63/811,183, filed on May 23, 2025, provisional application No. 63/811,145, filed on May 23, 2025.

(51) Int. Cl.
*G07F 11/62* (2006.01)
*G07F 9/10* (2006.01)
*G07F 11/16* (2006.01)
*G07F 17/00* (2006.01)

(52) U.S. Cl.
CPC .............. *G07F 11/62* (2013.01); *G07F 9/105* (2013.01); *G07F 11/165* (2013.01); *G07F 17/0078* (2013.01)

(58) Field of Classification Search
CPC .......... G07F 11/46; G07F 11/60; G07F 11/62; G07F 11/165; G07F 9/105; G07F 17/0078; G07F 17/0064; G07F 17/0071; G07F 17/0085; F25D 25/02; F25D 2325/021; A47F 3/004; A47F 3/06
See application file for complete search history.

(56) References Cited

U.S. PATENT DOCUMENTS

| | | | | |
|---|---|---|---|---|
| 6,564,964 | B2 | 5/2003 | Johnson | |
| 6,929,149 | B2 | 8/2005 | Selfridge et al. | |
| 7,575,407 | B2 * | 8/2009 | Tsujimoto | B65G 1/0407 414/279 |
| 7,682,113 | B2 | 3/2010 | Liou et al. | |
| 7,837,059 | B2 | 11/2010 | Hieb et al. | |
| 8,061,555 | B2 * | 11/2011 | Guglielmi | G07F 11/42 221/121 |
| 8,620,472 | B2 | 12/2013 | Mockus et al. | |
| 8,631,969 | B2 | 1/2014 | Faes | |
| 8,972,041 | B2 | 3/2015 | Hancock et al. | |

(Continued)

*Primary Examiner* — Timothy R Waggoner
(74) *Attorney, Agent, or Firm* — Kerr IP Group, LLC

(57) ABSTRACT

A dynamic shelving system and method is described. The shelving system includes a horizontal mounting structure and a vertical mounting structure that provides an adjustable support framework within a thermally insulated enclosure. The vertical mounting structure includes a plurality of vertical columns and the horizontal mounting structure includes a plurality of horizontal columns. Each shelf supports a frozen or refrigerated container. Additionally, each shelf includes a pallet and a depth adjustment plate. The pallet further includes a plurality of pallet openings that are positioned to align with at least one vertical column. Horizontal adjustment openings are associated with the horizontal mounting structure. Each vertical mounting column includes a column width adjustment opening that causes the vertical mounting column to be fixedly coupled to the horizontal mounting structure when a fastener passes through the horizontal adjustment opening and the column width adjustment opening.

20 Claims, 16 Drawing Sheets

(56) References Cited

U.S. PATENT DOCUMENTS

| | | | | |
|---|---|---|---|---|
| 9,240,091 | B2 | 1/2016 | Segal et al. | |
| 9,569,912 | B2 | 2/2017 | Faes | |
| 10,661,988 | B2 | 5/2020 | Asukai et al. | |
| 11,787,632 | B2 | 10/2023 | Manning et al. | |
| 2005/0067426 | A1* | 3/2005 | Holdway | G07F 11/16<br>221/131 |
| 2014/0034589 | A1* | 2/2014 | Hancock | G07F 17/13<br>211/71.01 |
| 2014/0305891 | A1* | 10/2014 | Vogler | A47F 1/126<br>211/59.3 |
| 2016/0275746 | A1 | 9/2016 | Stinson | |
| 2017/0036859 | A1 | 2/2017 | Lopes Ribeiro | |
| 2021/0390818 | A1* | 12/2021 | Shue | G07F 17/0078 |

* cited by examiner

DYNAMIC SHELVING FOR AUTOMATED FROZEN FOOD KIOSK SYSTEM

CROSS-REFERENCES

This application claims the benefit of U.S. Provisional Application No. 63/811,183, entitled "AUTOMATED FROZEN FOOD KIOSK AND DISPENSING SYSTEM WITH INTEGRATED FLEXIBLE PRODUCT PICK UP AND TRANSPORT SYSTEM, filed May 23, 2025. Additionally, this patent application claims the benefit of provisional patent application 63/811,160 entitled FLEXIBLE PRODUCT PICKUP SYSTEM FOR AUTOMATED DISPENSING SYSTEM, filed on May 23, 2025. Further, this patent application claims the benefit of 63/811,145 entitled ADAPTABLE AND CONFIGURABLE MECHANICAL SYSTEM TO ACCESS APPLIANCES IN AUTOMATED PRODUCTION ENVIRONMENTS, filed on May 23, 2025. These patent applications are hereby incorporated by reference in this patent application.

FIELD

The present invention relates to dynamic shelving for automated frozen food kiosk system. More specifically, the invention relates to dynamic shelving for frozen food containers having different shapes and sizes, which enable the same kiosk system to support different sized containers by enabling specific changes to the shelving components.

BACKGROUND

In automated food preparation and vending environments, particularly those involving frozen or refrigerated food items, efficient storage and retrieval of product containers is essential for both space utilization and product handling reliability. Many existing vending kiosks or automated kitchen systems rely on fixed shelving structures that are designed for uniform container shapes and sizes. These fixed systems often result in wasted space when handling smaller products or impose limitations on the types of containers that can be stored or retrieved by automated handling equipment.

As consumer demand grows for a wider variety of ready-to-eat, frozen, or refrigerated food products including items packaged in trays, bowls, pouches, or irregular shapes traditional fixed shelving configurations are unable to adapt dynamically to changing product dimensions. This lack of adaptability results in inefficient use of limited kiosk interior volume, especially within thermally regulated environments where space is further constrained by insulation and temperature maintenance systems.

Additionally, automated retrieval mechanisms such as gantry systems, robotic arms, or telescoping forks require consistent and predictable alignment between product containers and storage positions. When shelves are fixed in place, misalignment or incompatibility with newer packaging formats can lead to failed retrievals, dropped items, or mechanical interference.

Furthermore, automated food kiosks are increasingly deployed in retail, hospitality, and quick-service restaurant environments to provide unattended access to ready-to-eat or heat-and-serve food products. These kiosks often include both a "cold side" for refrigerated or frozen storage and a "hot side" for heating or cooking. A critical aspect of the cold side is the shelving system, which must securely store a variety of food containers prior to dispensing or transfer to a cooking module.

Conventional refrigerated or frozen kiosks typically rely on fixed shelving configurations designed around a single container geometry. Such static arrangements present several challenges. First, they restrict the kiosk operator to stocking only one or a limited set of package sizes, reducing flexibility in product offerings. Second, when packages of varying shapes, heights, or widths are introduced, fixed shelves result in wasted space, inefficient use of the insulated storage volume, or misalignment with automated retrieval mechanisms. Third, structural incompatibilities may compromise temperature uniformity and airflow, leading to uneven cooling or frost accumulation.

Prior shelving systems sometimes provide limited adjustability, such as removable racks or repositionable brackets. However, these solutions often require manual reconfiguration, are labor-intensive, and may not maintain sufficient structural stability for automated robotic retrieval. In many vending and kiosk applications, any manual reconfiguration interrupts service, adds maintenance overhead, and increases the risk of improper assembly.

SUMMARY

A dynamic shelving system is described. More specifically, the dynamic shelving system is for use within a refrigerated or frozen kiosk environment. The shelving system includes a horizontal mounting structure and a vertical mounting structure that provide an adjustable support framework within a thermally insulated enclosure. The vertical mounting structure includes a plurality of vertical columns and the horizontal mounting structure includes a plurality of horizontal columns.

Each shelf supports a frozen or refrigerated container. Additionally, each shelf includes a pallet and a depth adjustment plate. The pallet further includes a plurality of pallet openings that are positioned to align with at least one vertical column.

Horizontal adjustment openings are associated with the horizontal mounting structure. Each vertical mounting column includes a column width adjustment opening that causes the vertical mounting column to be fixedly coupled to the horizontal mounting structure when a fastener passes through the horizontal adjustment opening and the column width adjustment opening.

Row height adjustment openings are located along the vertical column. The row height adjustment openings supports variable vertical placement of the pallet. Each depth adjustment plate selectively varies the depth of a shelving plane. The shelving system maintains structural and thermal integrity under frozen operating conditions.

In one embodiment, each depth adjustment plate is positioned in discrete increments along the pallet to provide adjustable depth spacing. In another embodiment, the row height adjustment openings are spaced at uniform intervals along the vertical columns, and wherein the row height adjustment openings support adjustable vertical positioning of the pallets in defined increments.

In yet another embodiment, each depth adjustment plate includes a position stopper that prevents inserting the container beyond a predefined shelf depth. In a further embodiment, the pallet and the depth adjustment plate are coupled to the vertical column with at least one of a mechanical fastener and a slot-in interface.

In an event further embodiment, the horizontal mounting structure and the vertical mounting structure, the pallet, and the associated adjustment component are composed of materials selected for durability under sub-zero temperatures. In another embodiment, each pallet includes a planar upper surface with a predefined loading zone and having a geometric clearance to facilitate reliable engagement by a retrieval mechanism.

A method for configuring an adjustable shelving system for a plurality of frozen or refrigerated containers is also described. The method includes providing a horizontal mounting structure and a vertical mounting structure that provide an adjustable support framework within a thermally insulated enclosure. The vertical mounting structure includes a plurality of vertical columns and the horizontal mounting structure includes a plurality of horizontal columns. A plurality of horizontal adjustment openings associated with the horizontal mounting structure are coupled with the vertical mounting column that includes a column width adjustment opening, which causes the vertical mounting column to be fixedly coupled to the horizontal mounting structure when a fastener passes through the horizontal adjustment opening and the column width adjustment opening.

The method also includes installing a plurality of shelves, in which each shelf supports a frozen or refrigerated container, and each shelf includes a pallet and a depth adjustment plate. The method selects a vertical position for each shelf. The pallet further includes a plurality of pallet openings that are positioned to align with at least one vertical column. The method modifies the depth of one or more shelves by installing the depth adjustment plate to selectively define a rear stop position relative to a front access face of the shelf. The method secures the pallets and the depth adjustment plates using at least one of a mechanical fastener and slot-in interface.

In one embodiment, the method further provides a plurality of row height adjustment openings disposed along the vertical column. The row height adjustment openings support variable vertical placement of the pallet.

In another embodiment, each depth adjustment plate selectively varies the depth of the shelving plane. In yet another embodiment, the shelving system maintains structural and thermal integrity under frozen operating conditions. In a further embodiment, the method couples the pallet and the depth adjustment plate are to the vertical column with at least one of a mechanical fastener and a slot-in interface.

In an even further embodiment, each depth adjustment plate includes a position stopper that prevents inserting the container beyond a predefined shelf depth. In yet another embodiment, each depth adjustment plate is positioned in discrete increments along the pallet to provide adjustable depth spacing. Also, the row height adjustment openings are spaced at uniform intervals along the vertical columns, and the row height adjustment openings support adjustable vertical positioning of the pallets in defined increments.

FIGURES

The present invention will be more fully understood by reference to the following drawings which are presented for illustrative, not limiting, purposes.

Figure 5:
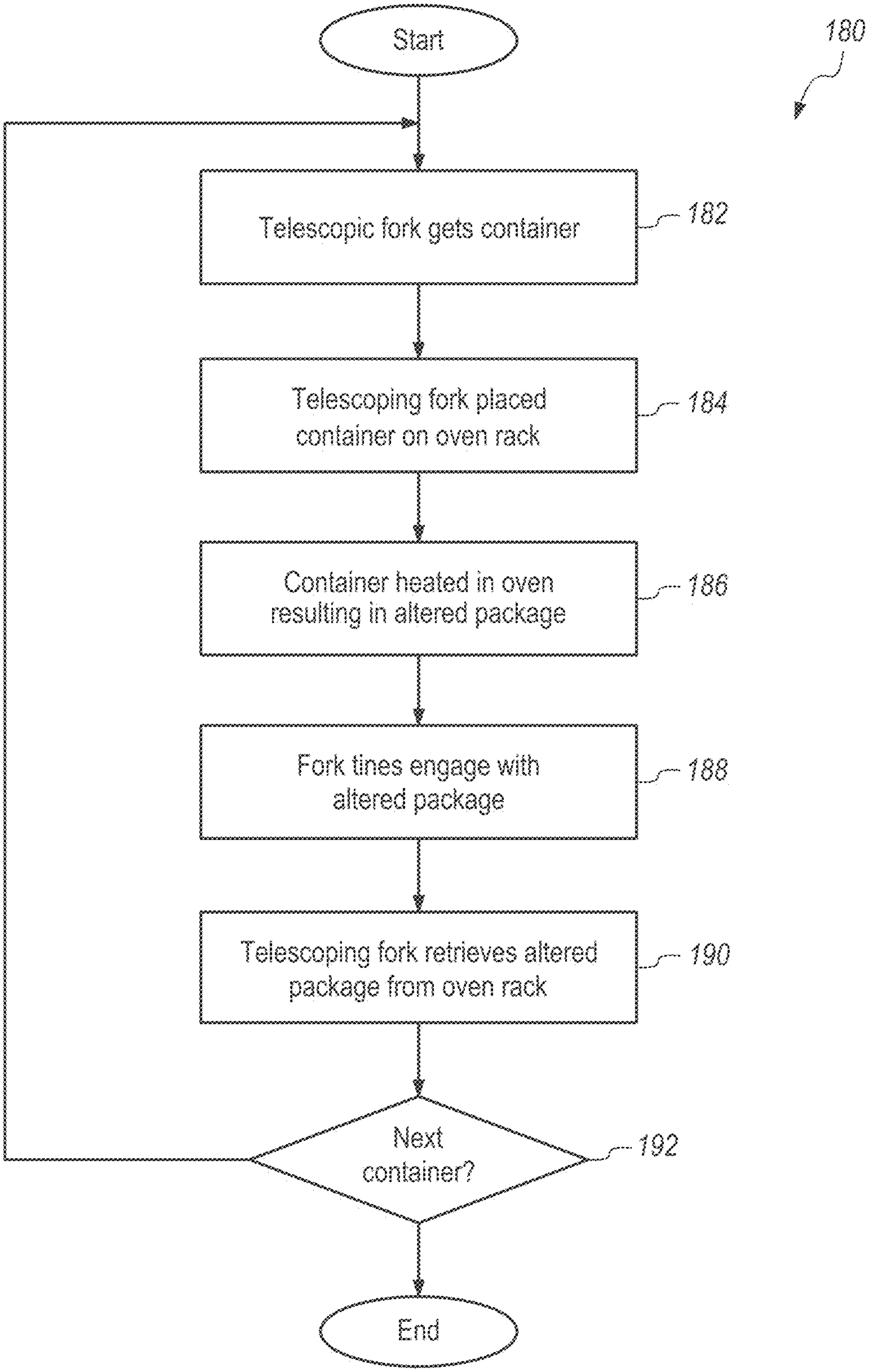

FIG. 5 presents an illustrative method for transporting a container or altered pack with the flexible pickup and transfer fork system.

FIG. 6A through 6G present a dynamic shelving system and method that can be configured to receive different sized and shaped containers. The shelving system includes a vertical mounting structure having vertical columns and a horizontal mounting structure having horizontal columns. Each shelf supports a frozen or refrigerated container.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus, systems and methods described herein may vary as to configuration and as to details. Additionally, the systems and methods may vary as to details, order of the actions, or other variations without departing from the illustrative methods disclosed herein.

There is a growing need for a dynamic shelving system capable of reconfigurable storage to accommodate frozen or refrigerated containers of varying shapes and sizes. As product offerings diversify ranging from flat trays and tall bowls to irregularly shaped pouches automated kiosk systems must handle a wider range of packaging geometries without compromising operational efficiency. Traditional fixed shelving, which is typically optimized for uniform containers, imposes limitations on storage density and product flexibility. In compact, thermally controlled environments such as food kiosks or smart vending units, this rigidity results in wasted volume and increased mechanical failure rates during automated retrieval, especially when newer package formats are introduced.

The dynamic shelving system described provides a low-effort or tool-less customization of shelf height, width, and depth to accommodate diverse container profiles while maintaining the structural integrity required for cold-chain storage. Such a dynamic shelving system operates reliably within insulated, temperature-regulated compartments where airflow, clearance tolerances, and environmental sealing are critical. Importantly, the shelving must remain compatible with robotic retrieval systems such as gantry arms or telescoping forks by preserving precise container alignment and repeatable access points. The ability to reconfigure shelving without requiring full system redesign or disassembly offers significant operational advantages, including SKU flexibility, faster product deployment cycles, and reduced downtime during format changes.

The illustrative dynamic shelving system is located on the illustrative "cold" side of an illustrative food kiosk. The cold side of the food kiosk includes containers that are stored in the dynamic shelving. The cold side of the illustrative food kiosk may include containers that are frozen or refrigerated. In some embodiments, the containers on the cold side of the kiosk may be stored at ambient or room temperatures.

The illustrative dynamic shelving system described herein is integrated with a picker that removes frozen containers from the dynamic shelving with a vertical I-gantry or a horizontal H-gantry. Adjacent to the cold side of the illustrative kiosk is a "hot" side that includes an illustrative appliance, e.g., oven. The appliance may be integrated with an adaptable and configurable mechanical system for opening and closing the certified appliance. The hot side of the kiosk may also include a flexible pickup and transfer fork system, which receives a frozen container from the illustrative cold side picker, transfers the container to the oven, removes the altered package from the oven, and delivers the altered package to a customer or cooking technician.

The illustrative flexible pickup and transfer fork system includes a telescoping fork that handles the placement of a container and removal of the container from an oven rack. The flexible pickup and transfer fork system can be used to transfer containers, which may also be referred to as "altered packages," from heated environments using the flexible fork-based architecture. The systems and methods described herein are not limited to any particular configuration or application, and may be applied in a variety of industrial, consumer, or robotic settings.

The flexible pickup and transfer fork system may also be integrated with the adaptable and configurable mechanical system designed to enable certified appliances to be opened and closed without altering the physical configuration of the appliance. By enabling physical interaction such as door opening and closing without modifying the appliance itself, the adaptable and configurable mechanical system for integrating with appliances preserves the appliance's original certified state. The adaptable and configurable mechanical system described herein includes an actuator disposed above or below the top surface of a certified appliance having a door that hinges about a horizontal axis.

In addition to the linear actuator, the adaptable and configurable mechanical system for opening and closing a certified appliance door includes a load distribution member that transfers the force (load) from linear actuator to a rod mechanism that is coupled to a clamping mechanism. The clamping mechanism interfaces with the appliance door handle or mounting plate adjacent to the appliance door handle.

The adaptable and configurable mechanical system is modular and configurable. Each mechanical element is replaceable or adjustable without affecting the appliance certification. The overall mechanical system acts as a compliant interface layer between fixed automation equipment and variable, certified appliances. The result is a highly adaptable mechanism that enhances system integration flexibility while complying with regulatory demands across a variety of production environments.

More generally, the systems and method described herein refer to a "container" or "package," which is a structure that holds contents prior to heating, such as a plastic tray, foil dish, or food-safe carrier. The result of processing the container through a heating process results in an "altered package." Note, the terms "container" and "package" may be used interchangeably in this patent. An "altered package" or "heated container" refers to a package resulting from the heating of a container, where physical deformation, leakage, material fusing, or adhesion to an oven rack may occur. The altered package may no longer fully contain its contents but remains the unit to be retrieved and handled by the flexible pickup transfer fork system method described herein. The term "package" is used interchangeably with the term "altered package," unless otherwise interpreted as "container" based on the context provided thereon. Also, the term "product" generally refers to an altered package or container or a partially deformed container.

For clarity, directional terms such as vertical, horizontal, and depth are used in a contextual and relational sense, anchored to gravity as a reference. The term vertical refers to the up/down direction consistent with gravity (e.g., shelf stacking height or lift motion). The term horizontal refers to the direction orthogonal to vertical, typically spanning across product rows or shelf columns. The term depth refers to the direction perpendicular to both vertical and horizontal and typically denotes motion into or out of an appliance or cavity (e.g., fork insertion into an oven). These directional terms are used to describe relative motion and alignment and may vary in absolute orientation across embodiments.

Figure 1A:
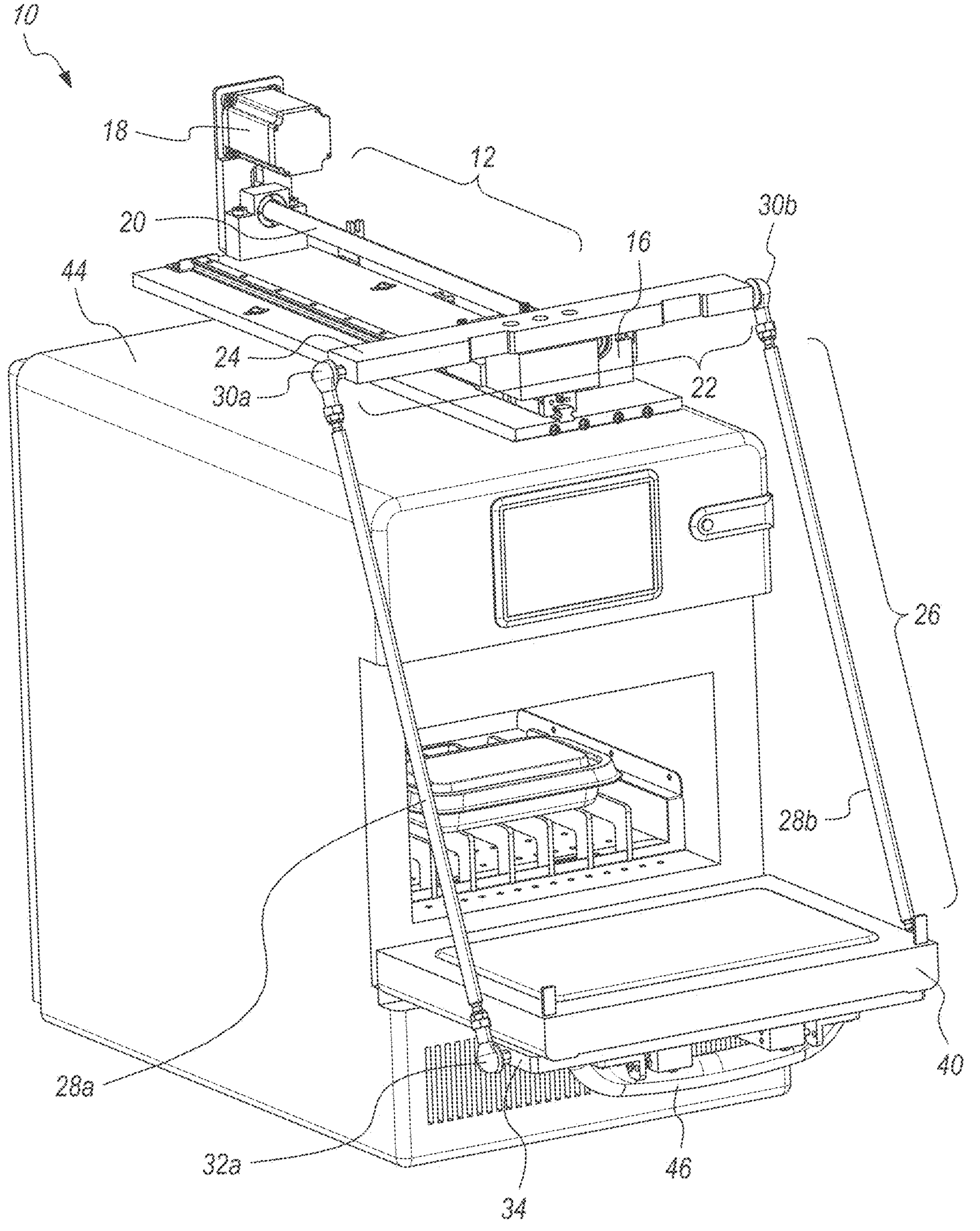
FIG. 1A is a perspective view of an adaptable and configurable mechanical system disposed above a certified appliance, which opens the appliance by applying a horizontal force with a screw motor mounted on the top surface of the appliance.

Referring now to FIG. 1A, there is shown a perspective view of an adaptable and configurable mechanical system 10 configured to open and close a certified appliance door 40 without affecting its certification. In this embodiment, the mechanical system 10 is disposed above the top surface 44 of appliance 48 and includes a linear actuator 12. In general, the linear actuator generates motion in a horizontal direction, vertical direction, or a combination thereof.

Figure 1B:
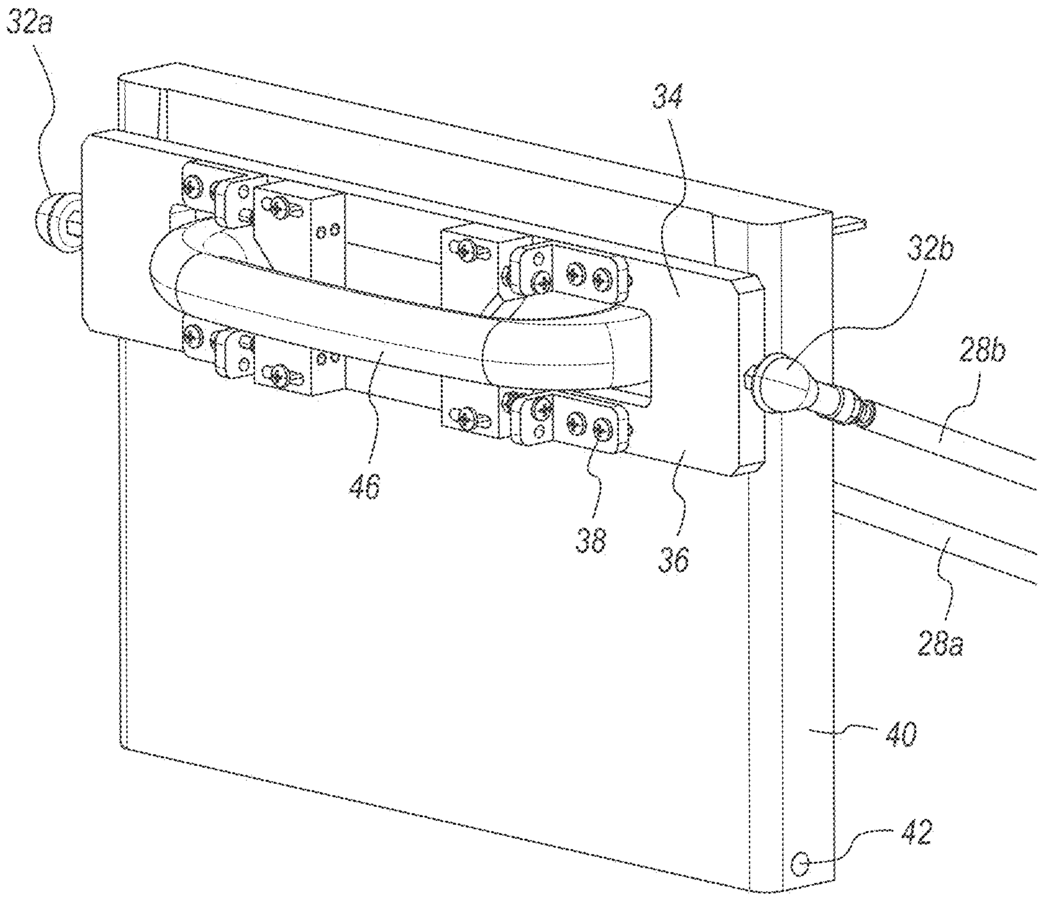
FIG. 1B shows an enlarged partial perspective view of the system of FIG. 1A, illustrating how the rods interface with the mounting assembly and attach to the appliance door handle.
Figure 1C:
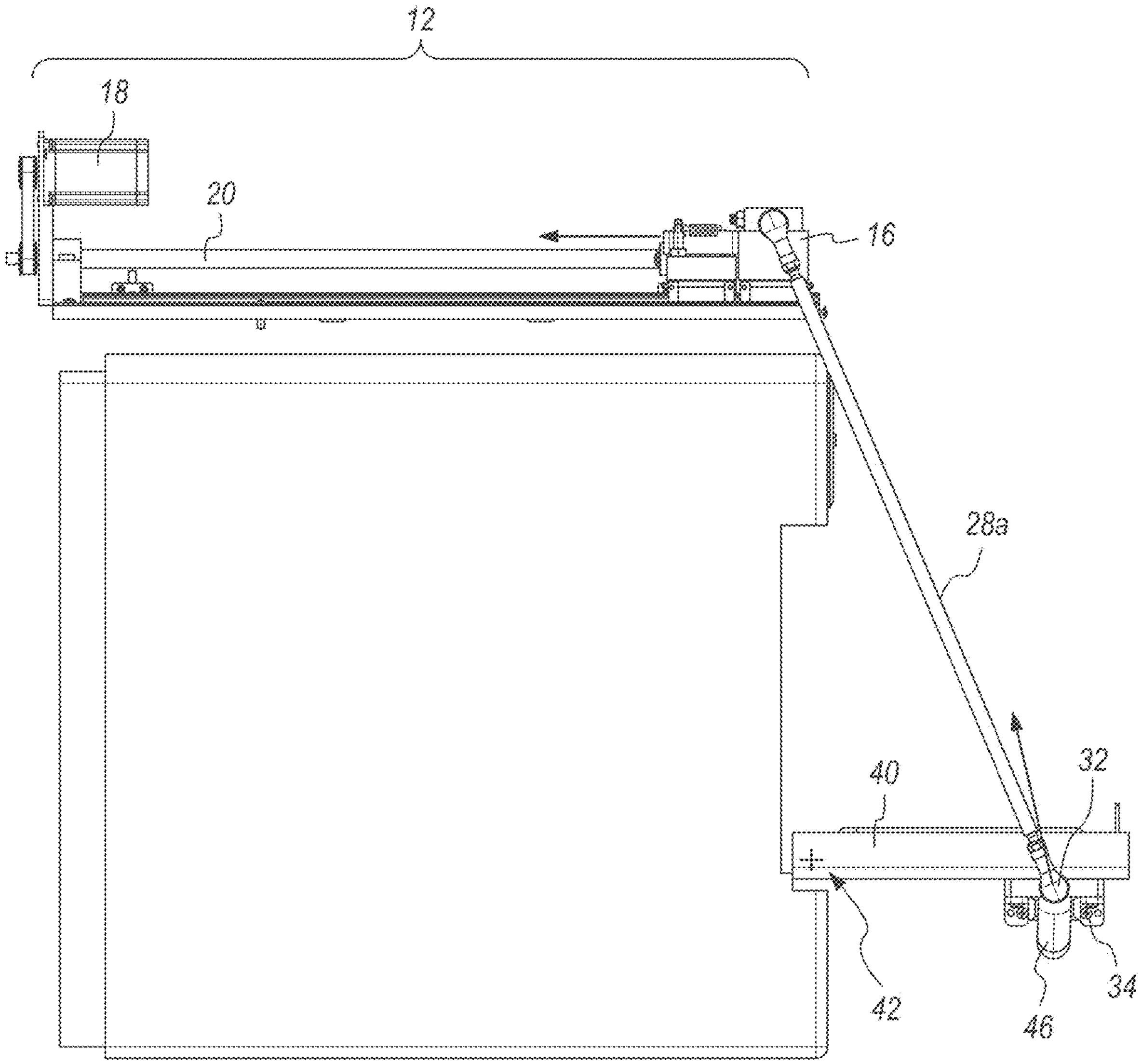
FIG. 1C is a side view of the system in FIG. 1A, focusing on the orientation and symmetry of the rods, the clamp mechanism to the door handle, and the linear output member.

In the illustrative embodiment shown in FIG. 1A through FIG. 1C, the linear actuator 12 includes a carriage 16 driven by a screw motor 18 and an associated lead screw 20. The carriage 16 translates linearly along the axis associated with the linear actuator 12 to generate controlled motion in a horizontal direction.

Generally, the linear actuator 12 is operatively coupled to a load distribution member 22, which distributes the force generated by the linear actuator 12. The load distribution member includes a buffer mechanism 24, which is operatively coupled to the carriage 16. The buffer mechanism may include a single slider buffer mechanism (not shown).

In the illustrative mechanical system 10, the buffer mechanism 24 includes a double slider buffer mechanism that distributes mechanical load and dampens transition forces. The illustrative double slider buffer mechanism 24 provides energy transfer between the linear actuator 12 and the downstream components.

The illustrative buffer mechanism 24 is connected to a rod mechanism 26 that includes two parallel guide rods 28*a* and 28*b* that extends outward from the buffer in a symmetrical configuration. These rods 28*a* and 28*b* form part of a double pull guide rod mechanism.

In the illustrative mechanical system 10, each guide rod 28*a*, 28*b* includes a first end 30*a*, 30*b* operatively coupled to the buffer mechanism 24 and a second end 32*a*, 32*b* operatively coupled to a clamp assembly mounted to the appliance door.

The clamp assembly includes a door mounting assembly 34 having a mounted plate 36 and securing fasteners 38, which are positioned proximate to the appliance door handle 46. The clamp assembly transmits the actuator's motion to the door while preserving all external appliance geometry.

In alternate embodiments, the clamping mechanism may include an adjustable gripping mechanism 52 (shown in FIG. 2A through FIG. 2B) to accommodate a variety of door handle geometries without requiring structural modification to the appliance. Thus, the mechanical system 10 enables an external automation interface to manipulate certified appliances with varied physical layouts supporting integration across different models and regulatory categories without triggering re-certification.

This figure illustrates the modular interconnection between the linear actuator 12, buffer mechanism 24, rod mechanism 26, and the clamp assembly, which reflects a compliant, adjustable solution that adapts to different appliance types and door geometries while maintaining alignment with maintaining appliance certification requirements.

FIG. 1B illustrates an enlarged partial perspective view of the adaptable and configurable mechanical system of FIG. 1A, showing in detail the interaction between the rod mechanism 28, clamping mechanism, and appliance door 40.

The door mounting assembly 34 includes a mounted plate 36 positioned proximate to the appliance door handle 46. The plate 36 is affixed using fasteners 38 enabling secure attachment to various door geometries without altering the certified appliance structure. Further, the guide rods 28*a*, 28*b* terminate in ball joints or similar flexible connectors that enable angular compliance between the actuation plane and the appliance's door geometry, which preserves force transfer integrity while accommodating variations in handle position or orientation.

Also visible in FIG. 1B is the door hinge 42 associated with an illustrative oven door. The door hinge pivots about a horizontal axis. The clamping assembly delivers linear actuation force from the actuator to the door via the rods, enabling door opening and closing motions without modifying the door or its handle. Thus, FIG. 1B demonstrates a compact, modular, and compliant interface between the actuator system and the certified appliance, enabling horizontal actuation from an above-appliance configuration.

FIG. 1C presents a side view of the adaptable and configurable mechanical system 10 illustrated in FIG. 1A, emphasizing the linear symmetry and component alignment of the system when the linear actuator 12 is disposed above or on the top surface of a certified appliance. FIG. 1C illustrates how motion is transferred from the screw motor 18, which drives a carriage 16 along a lead screw 20, through a load distribution member 22 and into a rod mechanism 26 that includes two guide rods 28*a*, 28*b* extending toward the appliance door 40.

The guide rods terminate at their second ends 32*a*, 32*b*, which connect to the door mounting assembly 34 via a pair of mechanical joints that preserve both mechanical compliance and force transfer. The door mounting assembly includes a mounted plate 36 fastened to the region proximate to the appliance door handle 46 using fasteners 38, forming a secure, yet reversible, clamping mechanism.

Figure 2A:
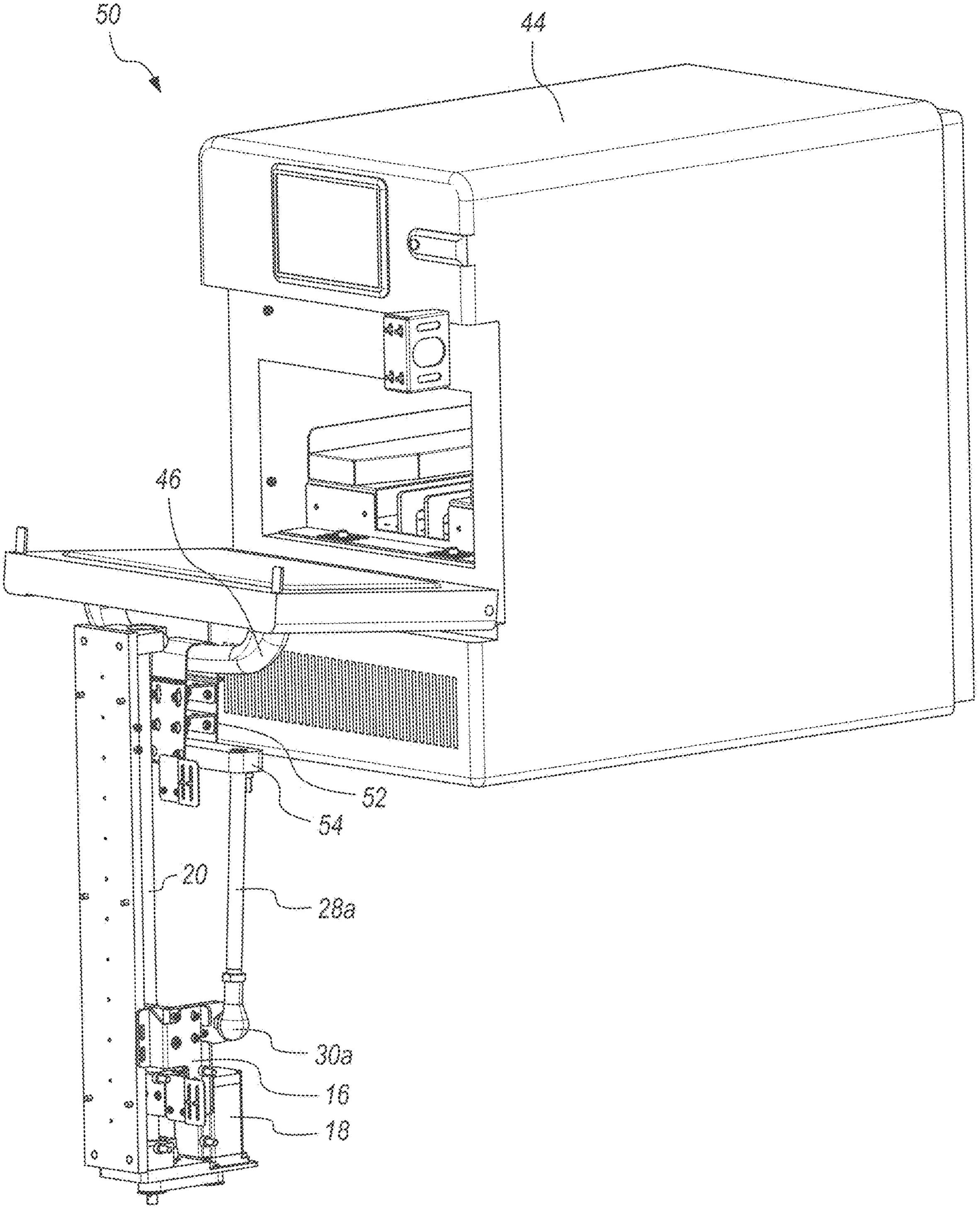
FIG. 2A illustrates a variation of the mechanical system in which the linear actuator is disposed below the top surface of the appliance, which opens the oven door by applying a vertical downward force to the appliance door and applying a vertical upward force to the appliance door to close the door.

FIG. 2A presents a perspective view of an embodiment of the adaptable and configurable mechanical system 50 configured to open and close a certified appliance door using a linear actuator 12 disposed below the top surface 44 of the appliance 48. This below-surface configuration is particularly useful in production environments where overhead clearance is limited. The mechanical system 50 is modular, mechanical adaptable, and provides a non-invasive integration with certified appliances. The combination of sub-surface actuation, adjustable gripping, and force-balancing load distribution ensures that appliance certification is preserved.

The mechanical system 50 includes an adjustable gripping member 52, which is in turn connected to a separate load distribution member 54 that is adjacent to the adjustable gripping member 52. The adjustable gripping member 52 is configured to engage an appliance door handle 46, regardless of variation in handle size, shape, or placement.

The distinction between mechanical system 50 and mechanical system 10 (shown in FIG. 1) is that the oven handle can be controlled from having the mechanical system 10 located above the oven handle or having the mechanical system 50 located adjacent to or even below the applicant door handle 46. The distinction between both mechanical systems in the illustrative embodiment is that the mechanical system 50 has a different gripping member 52, which is operatively coupled to the separate load distribution member; whereas, the mechanical system 10 includes a mounted plate 36 that is adjacent to the door handle and the guide rods 28 are operatively coupled to the mounted plate. Thus, depending on the engineering design constraints of the kiosk the adaptable and configurable mechanical system can be positioned in the optimal location.

With respect to mechanical system 50 shown in FIG. 2A, the load distribution member 54 bridges the mechanical connection between the guide rods 28*a* (not shown) and 28*b*. The load distribution member 54 and the adjustable gripping member 52 enables the actuator to apply vertical motion downward to open the appliance door and upward to close the appliance door through a compliant linkage, i.e., the adjustable gripping member 52, that adapts to variations in appliance door height and geometry.

In the illustrative mechanical system 50, the linear actuator assembly includes the screw motor 18 and lead screw 20 (that were also shown in FIG. 1), which drives the carriage 16 along a linear path. The carriage 16 delivers motion to a load distribution member 54. By way of example and not of limitation, the load distribution member 54 may incorporate a double slider buffer mechanism 24 as described above in FIG. 1.

The interface between the adjustable gripping mechanism 52, which may also be referred to as a clamping mechanism, and the rod linkage via the load distribution member 54 reveals how the mechanical system 50 accommodates varying appliance geometries by distributing actuation force through modular and compliant components. At the base of the system is the linear actuator, which includes a screw motor 18 driving the carriage 16 along a vertically oriented lead screw 20.

Coupled to the carriage 16 may be a load distribution member 22 (not shown in FIG. 2), which may also include a double slider buffer mechanism that permits lateral and angular compliance while maintaining vertical load transfer. Thus, the rods 28 may be coupled to the load distribution member 22 (not shown in FIG. 2) that is adjacent to the screw motor 18 and rods 28 may also be coupled to the second load distribution member 54.

FIG. 2A illustrates the modularity and separability of each subsystem, namely, the rods 28 are not rigidly affixed to the appliance door 40, and the clamp mechanism 52 may be adjusted, reconfigured, or replaced without altering the appliance structure. The illustrative load distribution member 54 serves a critical role in absorbing and transferring load evenly across the gripping interface, enabling reliable vertical door operation without inducing asymmetrical torque or point stress.

Figure 2B:
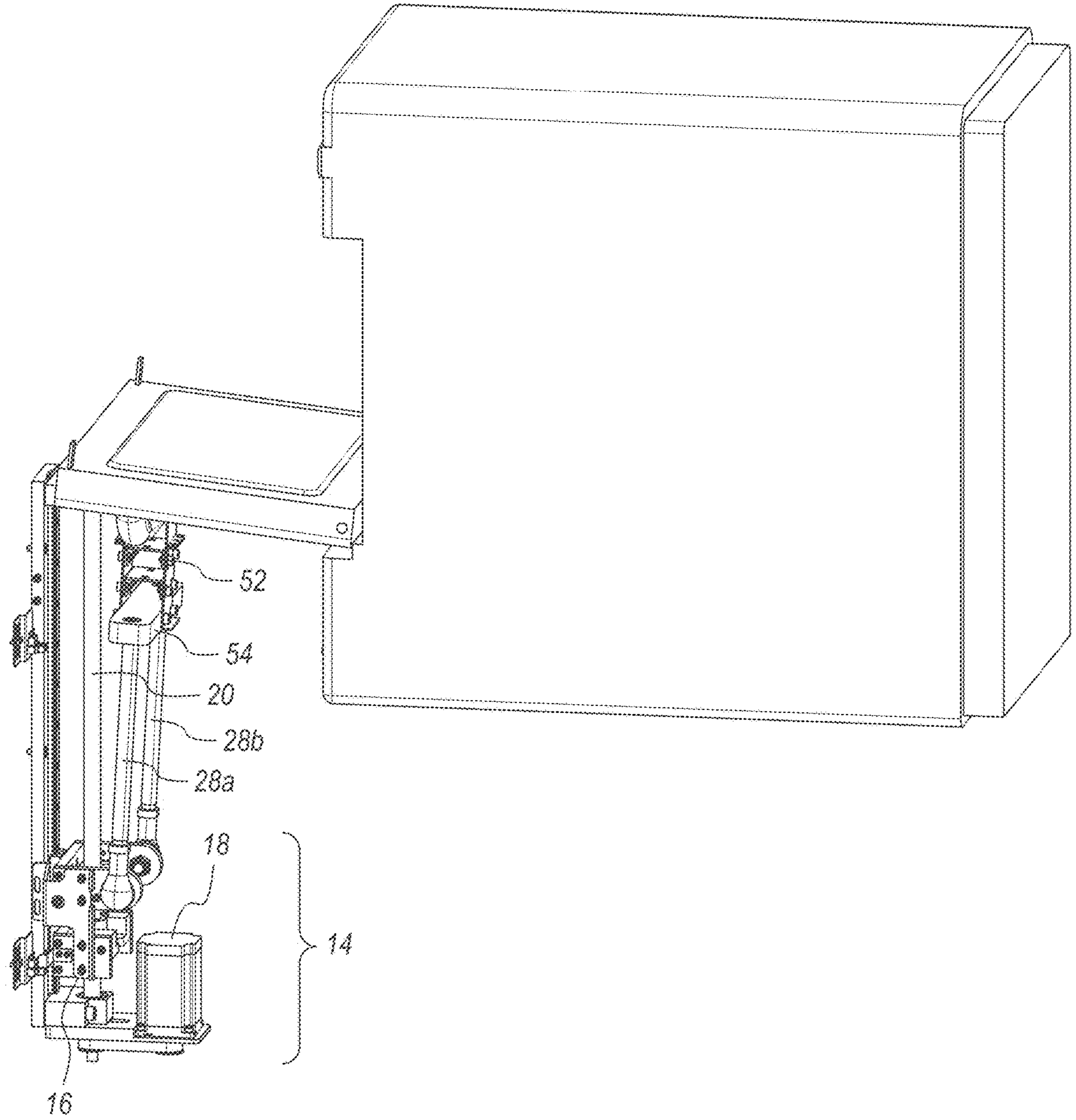
FIG. 2B is a side elevation view of the system of FIG. 2A, better illustrating the linear travel of the rods and positioning of the clamping mechanism.

FIG. 2B presents a side elevation view of the adaptable and configurable mechanical system described in FIG. 2A, illustrating the linear travel path of the vertical actuation system and the spatial relationship between the mechanical subsystems. FIG. 2B specifically highlights the location of linear actuator being disposed adjacent to or below the top surface 44 of appliance 48 that enables opening and closing of a certified appliance door 40 without structural modification to the appliance.

Again, the linear actuator includes a screw motor 18 and lead screw 20 that is mounted beneath the top surface 44 of the appliance 48. The motor 18 drives a carriage 16 vertically along the lead screw's axis. Attached to the carriage is a load distribution member, which may include a buffer mechanism such as a double slider buffer to manage the directional force transmitted to the two guide rods 28*a*, 28*b*.

The rods 28 terminate at the load distribution member 54, which is coupled to the adjustable gripping member 52 that further couples to the appliance door handle 46 using a clamping mechanism. The load distribution member 54 absorbs and distributes vertical force evenly across the adjustable gripping member 52.

FIG. 2B also clearly depicts the vertical motion path enabled by this system specifically, how downward actuation opens the appliance door and upward actuation closes it. The linear alignment between actuator, rods, clamp, and door handle ensures that force is transferred efficiently while minimizing mechanical strain or distortion on certified door components. By maintaining mechanical separation between the automation system and the appliance itself and using compliant, adjustable interfaces the system preserves certification integrity across varied appliance models.

In operation, the adaptable and configurable mechanical systems 10 and 50 interfaces with a certified appliance via an external clamping mechanism that is mechanically coupled to the appliance door handle. The clamp mechanism may include an adjustable gripping member that conforms to a variety of handle geometries, enabling attachment without structural modification to the door.

In the illustrative embodiment, the clamp assembly is symmetrically coupled to a pair of guide rods, e.g., a double pull rod mechanism, which extend from opposite sides of a central buffer mechanism mounted to a carriage driven by a screw motor. When the screw motor is energized, it drives the carriage forward or backward along a lead screw, causing the carriage to advance (push) or retract (pull) the buffer mechanism. This motion is transferred equally through the guide rods, which in turn apply balanced force to both sides of the clamp attached to the door handle. The symmetric configuration of the guide rods ensures even force distribution, reducing torsional loading on the appliance door and minimizing the risk of mechanical stress or misalignment during actuation.

As the appliance door begins to open or close, it may encounter varying levels of resistance due to internal latch mechanisms, gasket friction, or non-linear travel profiles inherent to the door's geometry. To accommodate these fluctuations, the illustrative buffer mechanism incorporates a double slider assembly with internal compression springs or equivalent elastic elements. When resistance is encountered (e.g., during latch disengagement), the buffer compresses, temporarily absorbing excess force and maintaining controlled motion. Once resistance subsides, the spring returns energy to the system, extending the buffer and restoring full rod travel.

This compliant behavior enables the adaptable and configurable mechanical systems 10 and 50 to preserve smooth actuation across variable conditions without transmitting shock loads back to the actuator or clamp. The mechanical systems 10 and 50 also compensate for misalignment, deflection, or uneven hinge wear, providing robustness and adaptability in production environments with mixed appliance configurations. During the closing phase, as the actuator retracts and the door is pulled shut, the buffer mechanism responds dynamically compressing or extending as necessary to accommodate the door's sealing force and any overtravel introduced by automated alignment. The clamp and handle to remain in alignment while avoiding overtightening or premature wear. Altogether, the system achieves precise, compliant, and non-invasive opening and closing of certified appliance doors by coordinating symmetrical rod actuation, central buffer compliance, and modular clamp engagement without altering the certified appliance structure.

Referring now to the flexible pickup and transfer fork system shown in FIG. 3 through FIG. 5. The flexible pickup and transfer for system handles packages or containers that have been physically deformed by heating or processing the package or container. In the illustrative embodiment, the package includes a food container that is heated, and moisture is produced from heating the food container. The flexible pickup and transfer fork system may also be used to bake dough, refrigerate, or freeze containers or altered packages.

The flexible pickup and transfer fork apparatus, systems, and methods described herein reduce the complexity associated with precisely selecting and positioning altered packages or containers without dropping the altered packages or containers. Additionally, differently sized altered packages or containers are handled by the apparatuses, components, systems, and methods described herein. Even if product dimensions associated with altered packages and containers are affected by the illustrative heating process, the structural integrity and surface friction of the container or altered package can be handled by the illustrative flexible pickup and transfer fork system and method.

The flexible pickup and transfer fork system and method described herein passively accommodates deformation of containers during and after processing (e.g., soggy boxes from baking). Additionally, the flexible pickup and transfer fork system does not require re-gripping, sensing, or motor-controlled adjustment during retrieval. Also, the flexible pickup and transfer systems and methods described herein operate without the need for clamping mechanism that must readjust in various coordinates and optimize pressure to pick up objects.

The illustrative flexible pickup and transfer fork system and method uses a combination of geometry and product interface position to secure the package without requiring a complex final product grabbing mechanism to adapt to secure the product whose physical characteristics may have changed as it is processed. Heat and moisture may change the product dimensions, structural integrity, and/or the surface friction of the resulting product.

The flexible pickup and transfer fork system does not require changing components. The flexible pickup and transfer fork system does not require a grasping adjustment component. Also, the flexible pickup and transfer fork system does not require force optimization or little or no force. Further, the flexible pickup and transfer fork system can operate faster, with fewer dropped products, and at a lower cost than conventional prior art systems and methods.

The flexible pickup and transfer fork system has a static geometry that solves dynamic package variability without sensors and without mechanical reconfiguration. Thus, the flexible lifting transfer fork module system eliminates mechanical complexity by relying on stable geometric principles rather than active adjustment. The flexible pickup and transfer system maintains reliable pickup even if the product dimensions of the illustrative food container or the surface friction of the food container change substantially during heating, cooling, or moisture exposure.

Figure 3A:
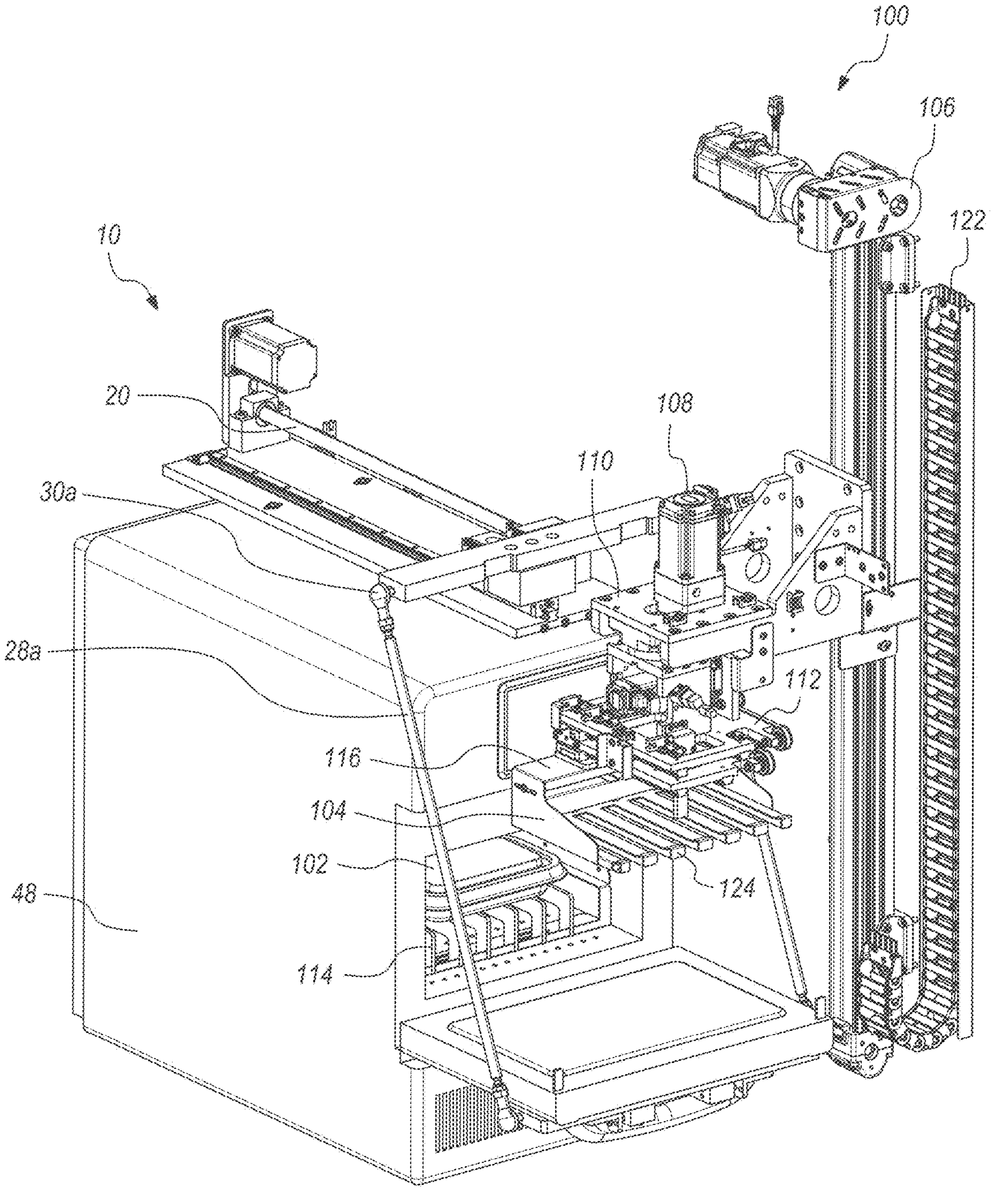
FIG. 3A is a perspective view of the flexible pickup and transfer fork system and the adaptable mechanical system that can open an appliance door.

Referring to FIG. 3A, there is shown a perspective view of the flexible pickup and transfer fork system 100 integrated with an adaptable mechanical system 10 for opening a certified appliance 48. This configuration enables full automation of package handling, including oven door access and package retrieval, without altering the certified appliance structure. Note, the flexible pickup and transfer system 100 may also be configured to interface with adaptable mechanical system 50 described above.

The flexible pickup and transfer fork system 100 includes a telescoping fork 116 operatively coupled to a lifting motion module 106. The lifting motion module 106 is configured to provide controlled vertical movement of the telescoping fork 116 along a vertical axis. The lifting motion module 106 is mounted to a gantry having a vertical drive shaft 122, which serves as a vertical support structure that guides and constrains the lifting motion module along the vertical axis.

The vertical drive shaft 122 provides a rigid framework for the vertical travel path. Together, the vertical drive shaft 122 and lifting motion module 106 enable precise vertical positioning of the telescoping fork 116 relative to an oven rack or package pickup surface. Additionally, the illustrative full gantry (not shown) includes a top horizontal drive shaft, a bottom horizontal drive shaft, and the vertical drive shaft is configured to move horizontally along the top and bottom horizontal drive shafts toward appliance 48. Thus, the gantry provides control along the horizontal axis and vertical axis. The flexible pickup and transfer fork system 100 provides control along an axial or depth axis (forward-backward movement into appliance 48).

FIG. 3A also shows a rotational assembly that includes a rotational motor 108 and a hollow rotary reducer 110, which enables the angular alignment of the telescoping fork assembly. The telescoping motion is actuated by a double-section telescopic mechanism 112, which allows compact retraction and staged extension of the fork 104 in the axial or depth axis to accommodate deep oven access or precise placement.

The system operates without requiring active grasping, force calibration, or pressure sensors. Instead, the geometry of the fork tines 124 and fixed alignment with the oven rack 114 enables passive engagement and retrieval of packages with variable structural integrity due to heating. The system supports removal of altered packages 102 that may exhibit deformation, surface adhesion, or leakage. This passive retrieval configuration reduces cost, increases system robustness, and minimizes failure modes due to soft or semi-fluid package deformation.

Figure 3B:
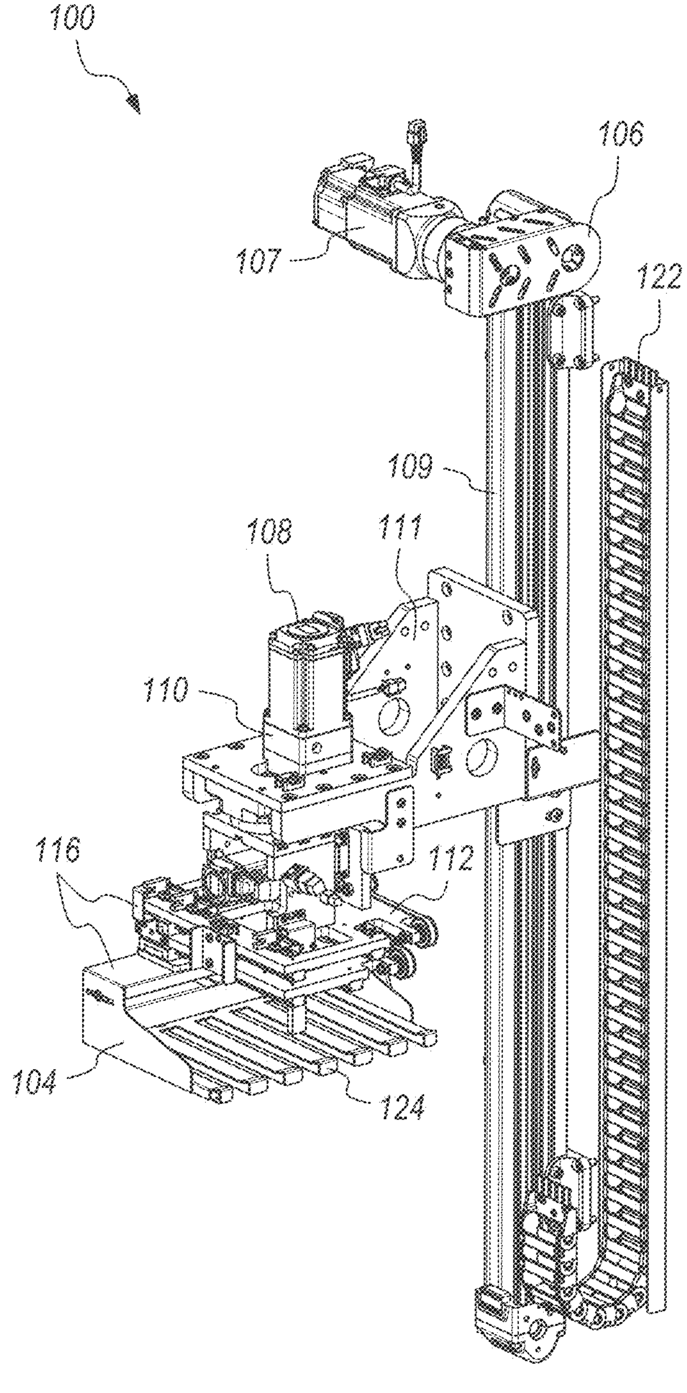
FIG. 3B shows a perspective view of the lifting transfer fork module.

FIG. 3B shows a perspective view of the flexible pickup and transfer fork system without the adaptable mechanical system 10. The telescoping fork 116 includes a plurality of fork tines 124 that interface with a container 101 and/or an altered package 102 that is located on the oven rack 114 (shown in FIG. 3A and FIG. 3C). The altered package 102 is generated by heating the container 101 in an oven 49 having oven rack 114. The lifting motion module 106 is operatively coupled to the telescoping fork 116. The lifting motion module 106 provides control of the telescoping fork 116 on a vertical axis.

In the illustrative embodiment shown in FIG. 3B, the lifting motion module 106 includes a linear actuator motor 107. Additionally, lifting motion module 106 may also include a vertical linear actuator 109 that engages with a vertical motion carriage 111.

The flexible pickup and transfer fork system 100 is coupled to a vertical drive shaft 122. More specifically, the telescoping fork 116, the lifting motion module 106, or the combination thereof are structurally coupled to and/or interface with the vertical drive shaft 122. The vertical drive shaft 122 provides constrains and guides the vertical motion of the telescoping fork along the vertical axis.

In operation, the fork tines 124 of the telescoping fork 116 pickup the container 101 or altered package 102. Also, the telescoping fork 116 removes the container or altered package from the oven rack 114 along the axial or depth axis.

In the illustrative embodiment presented herein, the telescoping fork 116 includes a telescoping mechanism and the fork 104 that receives the altered package 102 or the container 101. More specifically, the telescoping mechanism of the illustrative embodiment includes a double-section telescopic mechanism 112 configured to retract into a compact stowed position and extend to reach the altered package By way of example and not of limitation, the illustrative telescoping fork 116 is configured to remove the altered package 102. The altered package 102 may include an adhesive residue or viscous adherents such as a viscous food material exhibiting adhesive properties, including but not limited to melted cheese or sauce residues, which exude from the container and bond to the oven rack or surrounding surfaces. The food residue may also be highly viscous and thermally activated food substance with high viscosity and tackiness, such as molten cheese or sauce, that adheres to both the altered package and oven rack upon heating. The food substances that undergo material flow beyond the boundaries of the original container, result in partial adhesion between the altered package and the oven rack surface. More specifically, heated food elements, such as cheese-based substances, that experience thermal degradation of proteins and lipids, producing localized adhesion to oven-contact surfaces. Thus, the altered package may include at least one viscous or semi-solid food material that flows from the package during heating and adheres to the oven rack, requiring extraction without tearing or dislodging the altered package.

In a further embodiment, a kiosk that includes a user interface which receives a user input that directs the flexible pickup and transfer fork system 100 to handle the altered package 102, container 101, or the combination thereof.

The vertical drive shaft 122 is used to support or position the fork 100 along the vertical axis. The vertical drive shaft 122 may be used in other industrial applications or kiosk applications. For industrial applications where package deformation may occur in an industrial oven, the gantry having the vertical drive shaft 122 spans a relatively large space. The gantry may include linear motion tracks or wheels and support dynamic payloads or industrial tooling.

In the kiosk application, the gantry provides the structural and spatial intelligence needed to handle heated, warped, and deformed food containers in real-time. By providing precise motion control of the flexible pickup and transfer fork system 100 when trays or containers are deformed or displaced, the gantry provides safe, reliable package handling under consumer-facing conditions where tolerance for failure is low and packaging variability is high. Unlike industrial automation lines with rigid packaging, kiosk systems must handle low-cost, thermally unstable consumer packaging with care. This deformation creates pickup uncertainty due to drift in position, orientation, or adhesion of the container.

The gantry provides a rigid, spatially aware positioning system that includes precision motion in constrained spaces. Thus, the gantry allows the fork 104 to navigate irregular or shifted trays, compensating for small misalignments without damaging the container or surrounding components. Additionally, the gantry rigid framework ensures repeatable, calibrated movement unaffected by thermal drift or environmental heat distortion. In kiosks where weight constraints are critical, the gantry supports dynamic loads without sacrificing footprint or risking vibration-based error, e.g., the telescoping fork 116 experiencing tray resistance. Further, when a food container is deformed or off-axis, the gantry supports small adjustments in fork 104 position to re-center the deformed food container using sensor feedback.

Figure 3C:
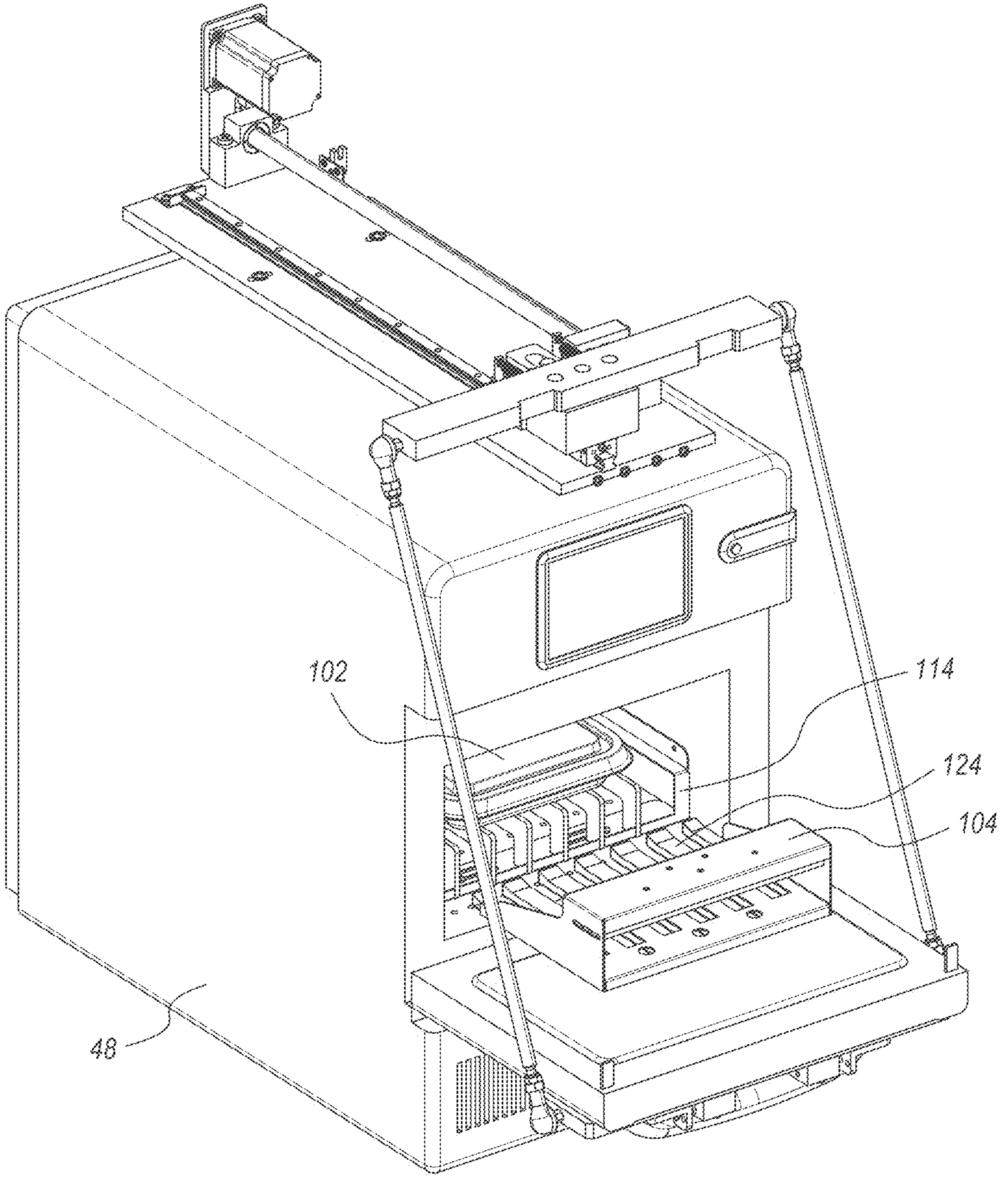
FIG. 3C shows a perspective view of the fork, a container or altered package positioned on the oven rack, and the fork positioned to initiate retrieval of the container or altered package.

FIG. 3C shows a perspective view of the fork, a container 101 or altered package 102 positioned on the oven rack 114, and the fork 104 positioned to initiate retrieval of the container or altered package. FIG. 3C emphasizes the operational geometry between the fork 104, which includes a plurality of fork tines 124, and the package disposed on the oven rack 114.

The oven rack 114 is a fixed or semi-fixed support structure located within appliance 48 that provides a placement surface for a container 101 or an altered package 102 during thermal processing or refrigerated processing. The oven rack 114 may include a planar mesh, slotted surface, or tray-support frame designed to withstand elevated temperatures, moisture, and exposure to viscous or semi-solid materials.

In the illustrative embodiment shown in FIG. 3C, the oven rack 114 forms a complementary interface with the fork tines 124 of the telescoping fork 116, enabling geometric engagement from below the package. In the illustrative embodiment, the oven rack includes a plurality of evenly spaced bars that are configured to receive a container 101 or an altered package 102. The oven rack and fork are dimensionally aligned to permit low-profile insertion of the fork tines without the need for force application, gripping, or re-alignment. Thus, the fork tines 124 are dimensioned and spaced to mate with gaps in a fixed rack structure to enable passive, non-invasive engagement of a deformable container The oven rack 114 may retain food residues, adhesive substances, or melted materials such as cheese or sauce that cause altered packages to adhere partially to the rack surface. Despite these conditions, the oven rack 114, in cooperation with the fork 104, enables extraction of the altered package without tearing or dislodging it improperly. The configuration allows for progressive entry of the tines beneath an adhered package without disturbing its structural integrity.

In this embodiment, the fork tines 124 are spaced and dimensioned to pass beneath the altered package 102, enabling secure pickup without the need for gripping or conformal adjustment, which is particularly beneficial when the package has deformed, sagged, or adhered to the oven rack due to thermal processing.

Figure 4A:
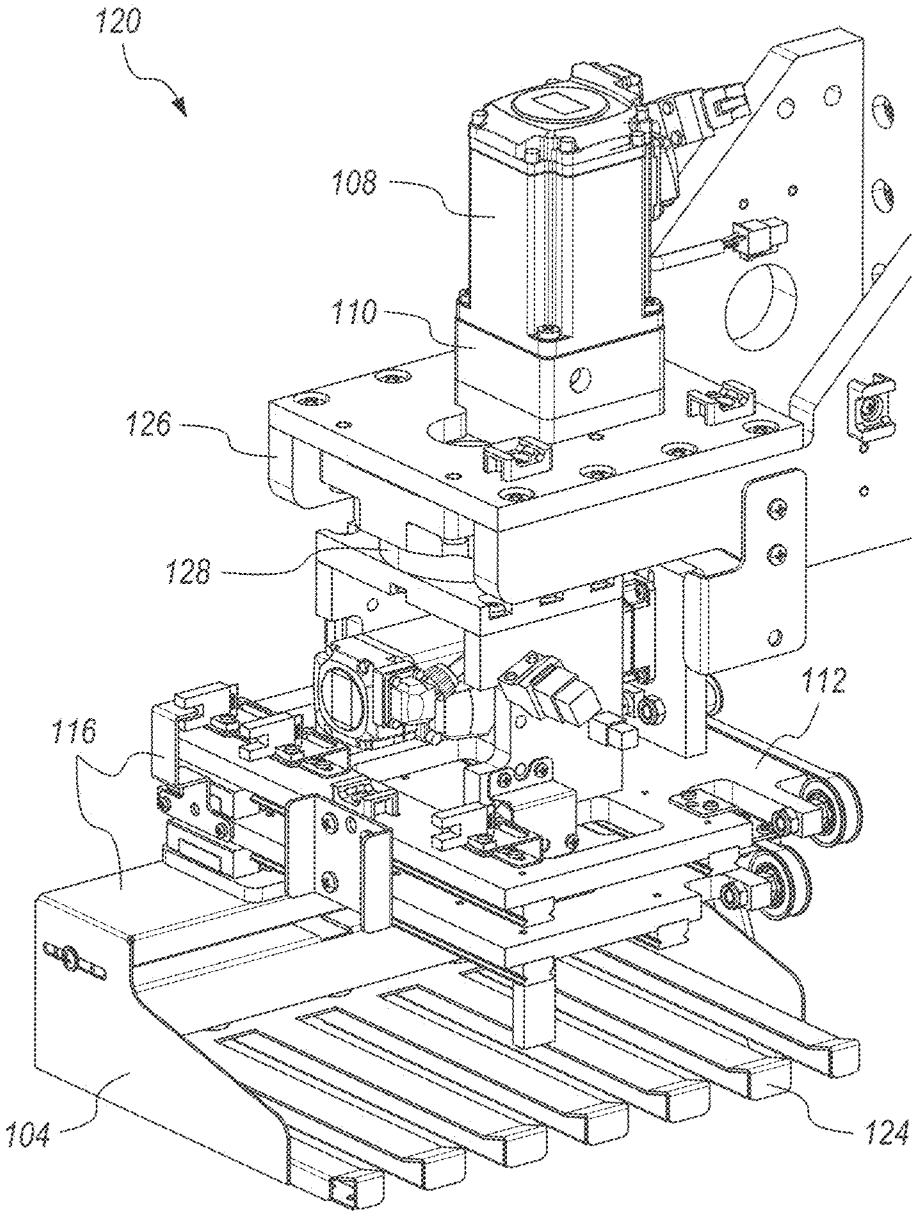
FIG. 4A shows a perspective view of the flexible pickup and transfer fork system.

FIG. 4A is a perspective view of a modular telescopic fork 120, which forms part of the flexible pickup and transfer fork system 100. FIG. 4A illustrates the structural arrangement of several integrated components used to retrieve a container 101 or altered package 102 from an oven rack 114 within an illustrative oven 49. In this view, the module telescopic fork 120 includes telescoping fork 116 shown in a retracted position, with the fork aligned along an axial or depth axis, i.e., moving forward or backward into the illustrative oven 49. By way of example and not of limitation, the fork 104 may be rotated approximately 180°, allowing a container 101 to be received at a predefined loading zone. Once loaded, the fork 104 is reoriented by the rotational motor 108 for package delivery or insertion.

The telescoping fork 116 includes a fork 104 that includes fork tines 124, which are dimensioned to slide beneath the container 101 or altered package 102 without requiring clamping or grasping. This configuration supports the pickup of heat-deformed or residue-adhered packages without damaging the container structure or its contents.

The axial motion of the telescoping fork 116 in and out of the oven 49 is achieved through a double-section telescopic mechanism 112 and powered by a stepper motor 130 (shown in FIG. 4B), which extends and retracts the fork 104 along the axial or depth axis. This allows the fork tines 124 to advance into or retract from the oven rack 114 while accommodating spatial constraints or partial adhesion from heated contents.

Above the telescoping mechanism is a rotational motor 108 and an associated hollow rotary reducer 110. These elements form a rotation carriage 126 that enables the fork 104 to rotate about a rotation bearing 128, providing angular alignment between the fork and the oven rack or package surface.

Figure 4B:
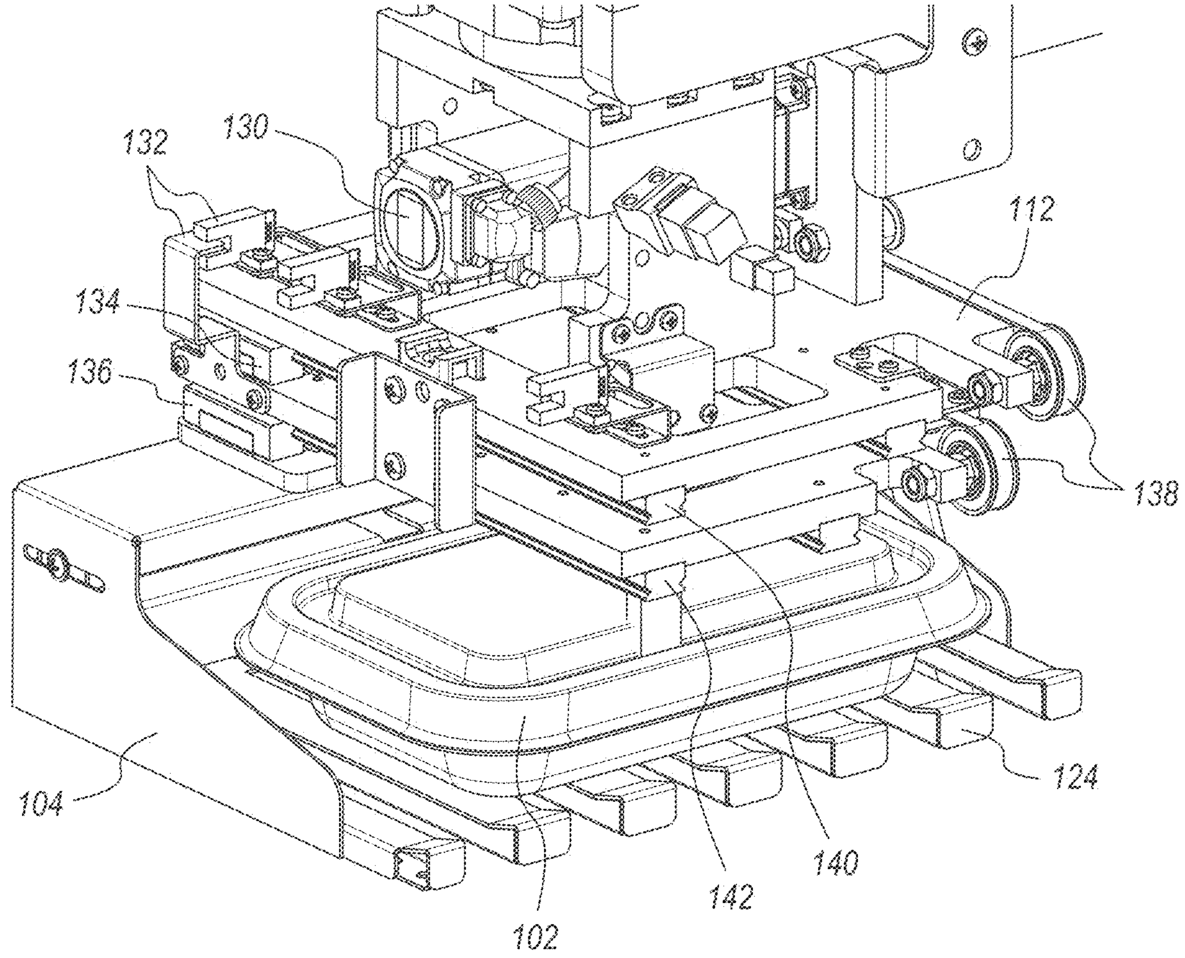
FIG. 4B shows a perspective view of the telescoping fork carrying a container or altered package.

This modular telescopic fork 120 allows the fork 104 to access the oven cavity from a constrained or front-facing orientation, adjust angular alignment, and engage a wide range of containers 101 or altered packages 102 particularly those deformed by heat or compromised by moisture without requiring real-time gripping or pressure calibration. FIG. 4A reinforces the system's capacity for passive engagement through fork geometry and placement logic, eliminating the need for force-adjustable grippers, and thus directly supports the structural and functional elements. This modular fork assembly 120 may be integrated with multiple gantry configurations and repositioned across various appliance types, including front-facing ovens, drawer systems, or constrained enclosures FIG. 4B is a perspective view of the fork 104 carrying a container 101 or altered package 102 after retrieval from an oven rack 114. The fork 104 is depicted in a retracted position, with both nested linear stages fully collapsed and the fork tines 124 supporting the package. The fork tines 124 are shown engaging the underside of the package 102 without requiring clamping or gripping. This passive geometry-based pickup is enabled by the shape, spacing, and profile of the tines, which allow them to slide beneath containers exhibiting deformation, adhesion, or leakage due to oven exposure.

Also visible in this figure is the double-section telescopic mechanism 112, which provides the linear extension and retraction of the fork. The fork 104 is shown in a retracted state, in which the package 102 is securely supported by the fork tines 124 despite potential deformation or surface irregularities. This configuration further demonstrates how the system eliminates the need for pressure sensors, grasping mechanisms, or complex reactive feedback loops. The secure retrieval relies on fixed geometry and controlled motion through a stepper motor driven telescopic mechanism.

In FIG. 4B, the telescoping fork 116 is driven by a multi-stage actuation system that includes a stepper motor 130 mounted to the base of the telescopic assembly. The stepper motor 130 enables precise control of extension and retraction along the depth direction or forward-retracting axis. To ensure accurate tracking and positional awareness, the system includes an optical sensor and flag assembly 132, which detects and signals the positional limits or homing position of the telescopic stages.

The double-section telescopic mechanism 112 includes two nested linear stages. The first extension stage is guided by stage 1 linear motion guide 134 and supported by stage 1 linear rail 140, which allow the outer segment of the fork to extend outward from the base. The second extension stage is guided by stage 2 linear motion guide 136 and supported by stage 2 linear rail 142, enabling further reach from within the first stage.

Both stages are driven in coordination by a pair of linear motion drive belts 138, which transmit motion from the stepper motor 130 through a synchronized pulley or tensioning system (not shown). These belts enable compact, low-backlash extension of the fork while maintaining precise positioning of the load.

FIG. 4B emphasizes the structural layering and precision mechanics of the telescopic fork system, which supports high-reliability operation without clamping or force-sensitive feedback. The visible drive components demonstrate how the system accommodates retrieval of altered packages even when subjected to adhesion or deformation due to heating.

Figure 4C:
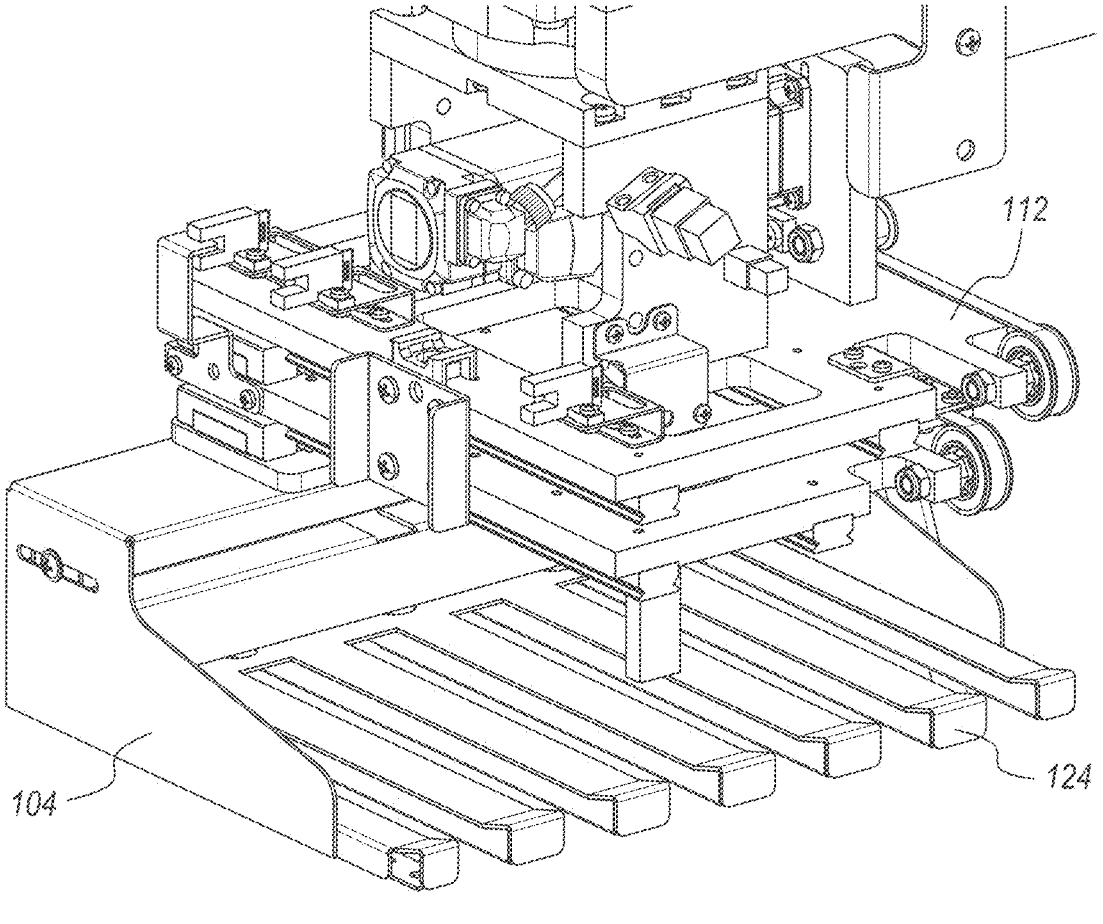
FIG. 4C shows a perspective view of the telescoping fork without the container or altered package.

FIG. 4C shows a perspective view of the telescoping fork 116 in a retracted state without a container or altered package. This configuration illustrates the spatial configuration and actuation readiness of the fork system during an idle or pre-engagement phase of the fork system during an idle or pre-engagement phase. The fork tines 124, extending from the fork 104, are clearly visible and spaced to enable low-profile insertion beneath a container 101 or altered package 102 situated on an oven rack 114.

This figure emphasizes the passive pickup capability of the system, by showing how the fork tines 124 are designed to slide beneath containers or altered packages without gripping, clamping, or conformal adjustment. The fixed geometry of the fork allows the system to engage with packages that may be sagging, warped, or partially adhered to the oven rack especially those altered by thermal processing.

FIG. 4C reinforces the system's design advantage, in which the flexible pickup and transfer fork system 100 operates without real-time sensing or active grasping mechanisms. Instead, the flexible pickup and transfer fork system 100 uses predictable geometry and motion to retrieve a package, even when structural characteristics (e.g., surface friction, rigidity, or dimensions) vary unpredictably due to heating.

In the kiosk embodiment such as a smart food vending system, an autonomous restaurant module, reheating station, the gantry serves as the precision backbone for navigating complex, heated, and spatially constrained operations. After reheating, food trays may warp, soften, or shift position due to thermal expansion, container material (e.g., plastic or biodegradable trays), or packaging inconsistencies.

The flexible pickup and transfer fork system 100 supports the secure transfer of deformable packages through a fixed-geometry fork and rack design, eliminating the need for active mechanical adjustment or sensor-based grip recalibration during material handling. The system supports passive, geometry-based pickup of deforming or changing packages. The key improvement includes no grasp force adjustment, no real-time regripping or sensor-driven correction.

The flexible pickup and transfer fork system 100 does not require real-time mechanical adaptation. Also, the flexible pickup and transfer fork system 100 does not require a gripper and associated electronic feedback loops that adjust gripper behavior.

The flexible pickup and transfer fork system and method is configured to pickup a range of products with differing physical characteristics that change throughout processing without requiring an adjusting mechanism that grabs and holds the product. Additionally, the flexible pickup and transfer fork system and method reduces the number of necessary components and allows a greater accommodation for different and varied package sizes. Also, the flexible pickup and transfer fork system and method also reduces failed pickups and drops due to product physical changes as it is processed. Furthermore, the flexible pickup and transfer fork system and method reduces the time for the product to cycle.

Further still, the flexible pickup and transfer fork system 100 is uniquely suited to environments in which packaging deformation, leakage, or displacement would compromise traditional robotic grippers. By relying on a passive geometric interface and multi-axis movement, the system supports high-throughput handling without requiring force calibration, regripping, or shape-conforming tools. This reduces cost, complexity, and mechanical wear.

Referring to FIG. 5, there is shown a method 180 of transporting a container or altered pack with the flexible pickup and transfer fork system 100 described above. The flexible pickup and transfer system 100 and method 180 provides a flowchart of illustrative operations performed by the flexible pickup and transfer fork system 100.

The method is initiated at block 182, where a telescoping fork 116 having fork tines 124 is activated to acquire a container 101. Note, container 101 has not yet been altered by appliance 48, which for illustrative purposes is oven 49. By way of example and not of limitation, the telescoping fork may pick up the container from a loading zone (not shown) or from a delivery system such as a picker (not shown).

Block 182 may include initializing the lifting motion module 106, rotational motor 108, and hollow rotary reducer 110, which cooperate to position the fork 104 at the correct height and angular orientation based on the location of the illustrative container 101. Simply put, the correct position for the fork 104 is determined relative to the location of the container 101.

At block 184, the illustrative method proceeds with the fork tines 124 interfacing with container 101 and then placing the container 101 onto the oven rack 114. In this illustrative embodiment, the container 101 represents a food package prior to processing in oven 49. The method proceeds by withdrawing the telescoping fork 116 from the oven 49.

At block 186, container 101 undergoes a heating cycle within the oven 49, resulting in a thermally altered package 102 supported by the oven rack 114. This altered package may exhibit structural deformation, leakage, surface adhesion, or other physical changes due to exposure to heat and moisture.

At block 188, the telescoping fork 116 is reinserted into the oven and fork tines 124 engage with the altered package 102. More specifically, the fork tines 124 are configured to fit between the oven rack bars so that the fork tines 124 interface with the altered package resting on the bars of the oven rack.

At block 190, the altered package 102 is retrieved from the oven rack 114 and removed by the telescoping fork 104 as described above. This pickup phase completes the handling sequence.

At decision diamond 192, a determination is made as to whether another container or altered package is to be handled. If so, the method returns to block 182 to repeat the process for the next unit. If no additional containers remain, the method ends or transitions to a standby state until reinitiated by user input or system control logic.

In some embodiments, a gantry system is operatively coupled to the lifting motion module, enabling movement of the fork system along three orthogonal axes, namely, a horizontal axis (left-right), a vertical axis (up-down), and an axial or depth axis (forward-backward into the oven or appliance housing). This multi-axis configuration allows for precise three-dimensional positioning of the fork 104 to accommodate various package placements.

The telescoping fork system may include a double-section telescopic mechanism 112, which interfaces with a fork 104 to extend or retract the fork for package placement or retrieval. This configuration allows for extended reach while maintaining a compact profile during idle states.

The method 180 is configured to remove altered packages that may include viscous or adhesive food residues (e.g., melted cheese, sauces) that bond to the oven rack or package surfaces. The telescoping fork is engineered to extract such altered packages without tearing, dropping, or damaging the package, even in the presence of surface adhesion or structural irregularity. The transfer fork system and method is configured to pick up a range of products with differing physical characteristics that change throughout processing without adjusting the mechanism that grabs and holds the product. The flexible pickup and transfer fork system and method provides a simplified system and method of placing or retrieving altered containers having unknown or changing physical characteristics. The telescoping fork described herein may be used for any other industrial and commercial application such as manufacturing and production application. The described systems and methods provide improved reliability in handling deformed or heat-compromised packages without the need for active clamping, shape sensing, or force feedback. The fixed-geometry fork and rack components ensure high-speed, low-cost operation with reduced component complexity, making the system well-suited for automated kiosks, commercial kitchens, and industrial meal processing lines.

In certain embodiments, the method includes receiving a user input via a kiosk interface as described above. The kiosk provides commands or selections that instruct the flexible pickup and transfer fork system to handle a specific altered package. The interface may be graphical, tactile, or remote, depending on application. In an industrial or manufacturing context, the method may be implemented in a facility that continuously processes multiple packages as described above. The method is configured to repeat the heating and retrieval process for a plurality of altered packages, each removed from the oven using the telescoping fork system, without requiring manual intervention or component resizing.

In alternative embodiments, the systems and methods described above may optionally incorporate sensors such as thermal cameras, optical systems, or weight detectors to determine readiness or alignment of the altered package. These sensors may assist in fork positioning or confirm successful pickup, particularly in high-speed industrial environments.

Figure 6A:
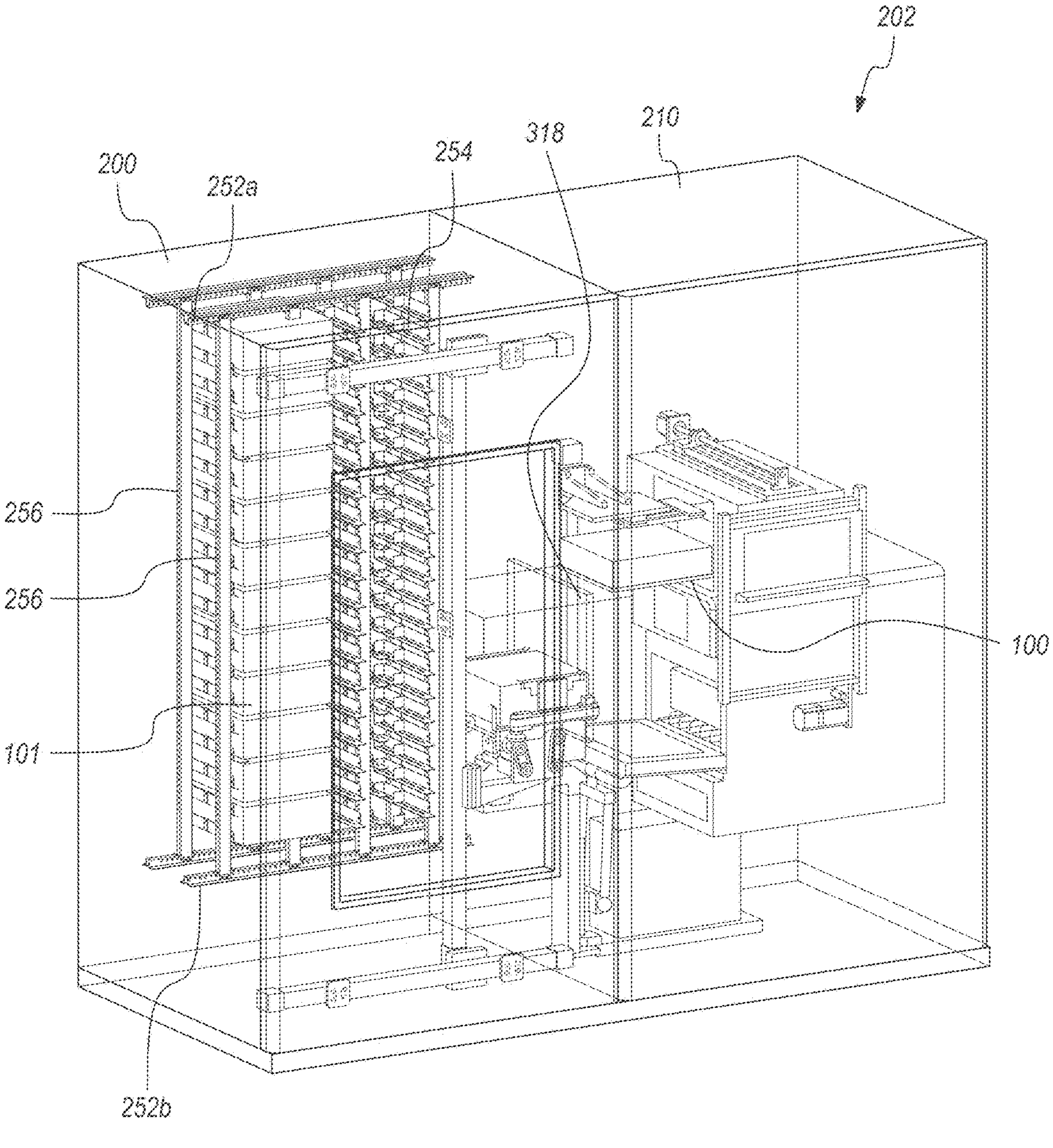
Figure 6B:
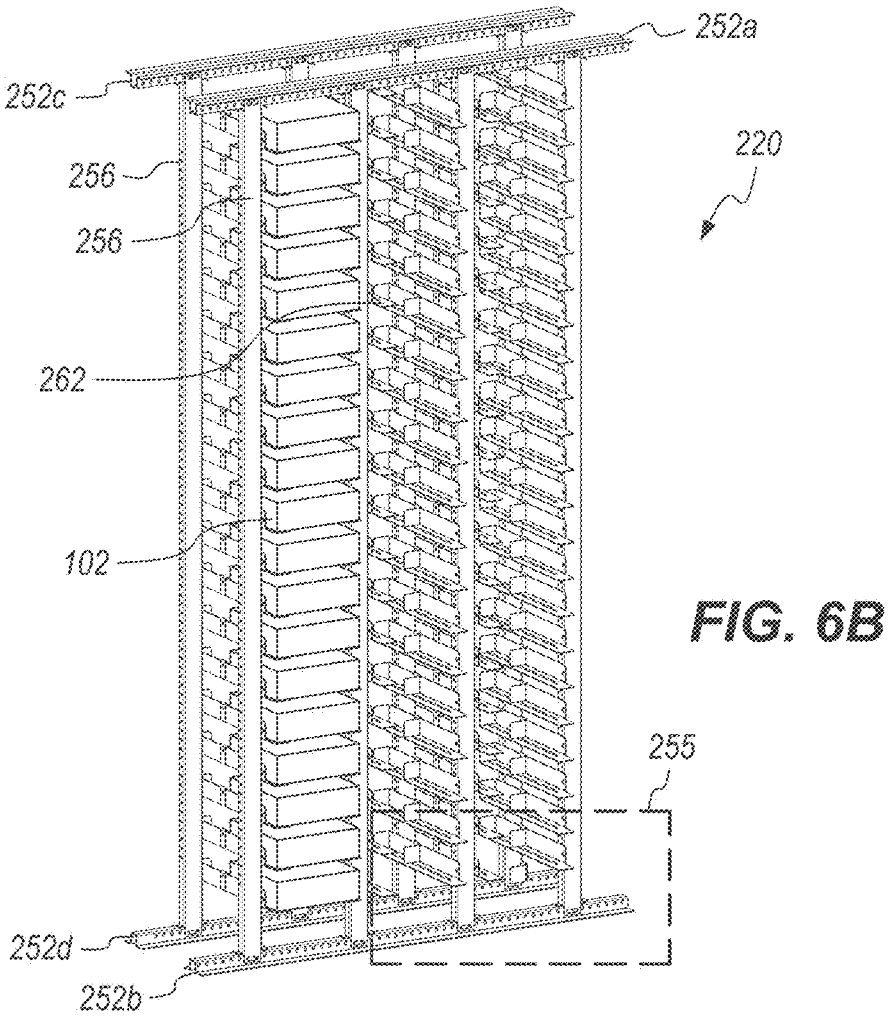

Referring to FIG. 6A and FIG. 6B, there is shown a dynamic shelving system 220 located on the illustrative "cold" side 200 of a food kiosk 202. The cold side 200 of the food kiosk 202 includes containers 101 that are stored in the dynamic shelving. The cold side 200 of the illustrative food kiosk may include containers that are frozen or refrigerated. In some embodiments, the containers on the cold side of the kiosk may be stored at ambient or room temperatures. FIG. 6B, shows the dynamic shelving system 220 isolated from the picker, the I-gantry, and the hot side 210 of kiosk 202.

The cold side 200 of the illustrative kiosk 202 is integrated with the hot side 210 of the kiosk. The hot side of kiosk 210 includes the flexible pickup and transfer fork system 100, which is partially shown in FIG. 6A. The flexible pickup and transfer fork system 100 includes a telescoping fork that handles the placement of the container 101 in the oven rack and removal of the altered package 102 from the oven rack as described above. In FIG. 6B, there is shown the isolated dynamic shelving system 220, which is used by the kiosk 202 shown in FIG. 6A.

Referring to FIG. 6A and FIG. 6B, there is shown the four (4) illustrative horizontal mounting structures **252*a*, 252*b*, 252*c*, and 252*d* that support horizontal adjustments. Additionally, the vertical mounting structures 256 that support vertical shelf height adjustment are also shown. A closer inspection of FIG. 6B reveals that eight (8) vertical mounting structures 256 are shown. The horizontal mounting structures 252 and vertical mounting structures 256 provide an adjustable support framework within the thermally insulated enclosure for the cold side 200 of the kiosk 202**.

Referring to FIG. 6B, there is shown the dynamic shelving system 250 that includes a horizontal mounting structure 252 and a vertical mounting structure 256 that provides an adjustable support framework within a thermally insulated enclosure.

Figure 6C:
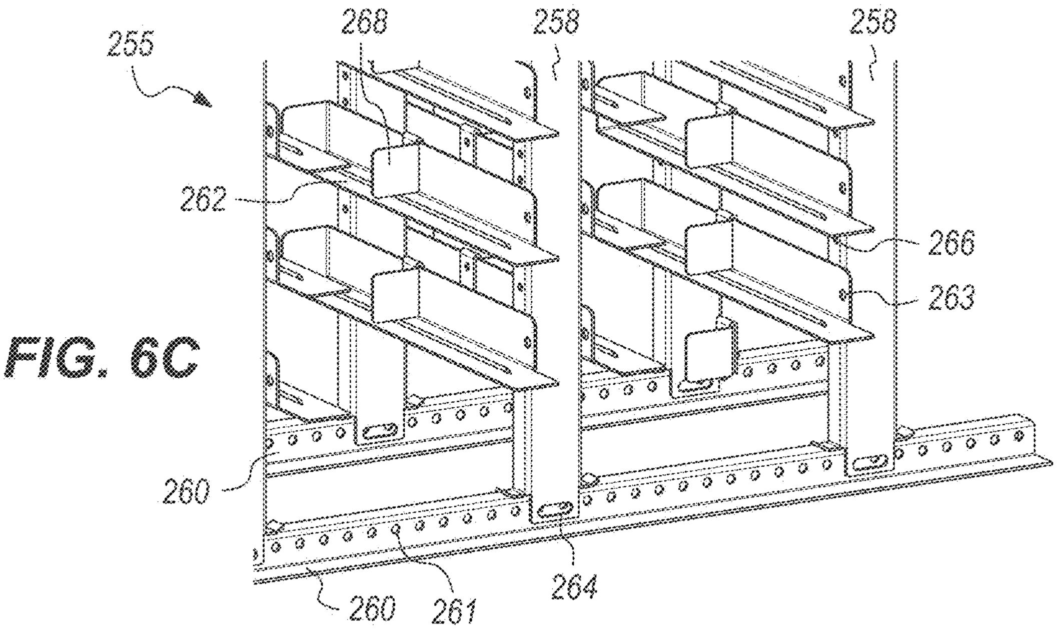

Referring to FIG. 6C, there is shown an exploded view of window 255 shown in FIG. 6B. The vertical mounting structure 256 includes a plurality of vertical columns 258 and the horizontal mounting structure 252 includes a plurality of horizontal columns 260.

Referring back to FIG. 6A there is shown a shelf 254 that supports a frozen or refrigerated container 101. Additionally, each shelf 254 includes a pallet 262 and a depth adjustment plate 268, which is shown in further detail in FIG. 6C. The pallet 262 further includes a plurality of pallet openings 263 that are positioned to align with at least one vertical column 258.

FIG. 6C also shows the horizontal adjustment openings 261 are associated with the horizontal column 260. Each vertical column 258 includes a column width adjustment opening 264 that causes the vertical mounting column 258 to be fixedly coupled to the horizontal column 258 when a fastener passes through the horizontal adjustment opening 261 and the column width adjustment opening 264.

Row height adjustment openings 266 are located along the vertical column 258. The row height adjustment openings 266 support variable vertical placement of the pallet 262. Each depth adjustment plate 268 selectively varies the depth of a shelving plane 272. The shelving system maintains structural and thermal integrity under frozen operating conditions.

In one embodiment, each depth adjustment plate 268 is positioned in discrete increments along the pallet 262 to provide adjustable depth spacing. In another embodiment, the row height adjustment openings 266 are spaced at uniform intervals along the vertical columns 258. The row height adjustment openings 266 support adjustable vertical positioning of the pallets 262 in defined increments.

Figure 6D:
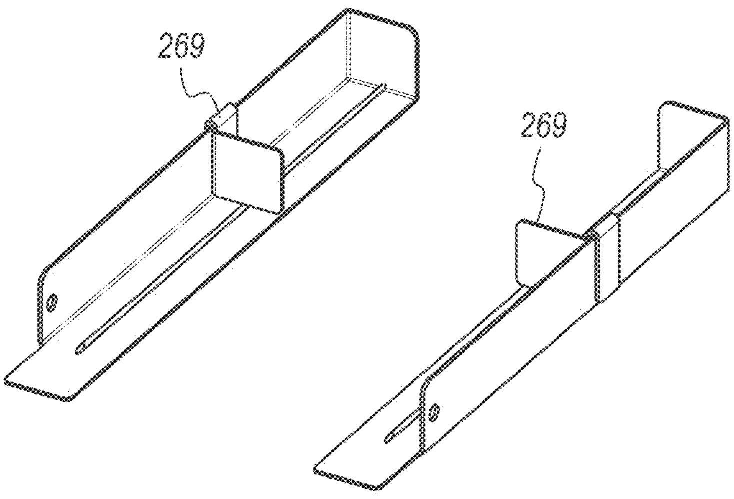

Referring to FIG. 6D, there is shown another embodiment, in which each depth adjustment plate 268 includes a position stopper 269 that prevents inserting the container 101 beyond a predefined shelf depth.

Figure 6E:
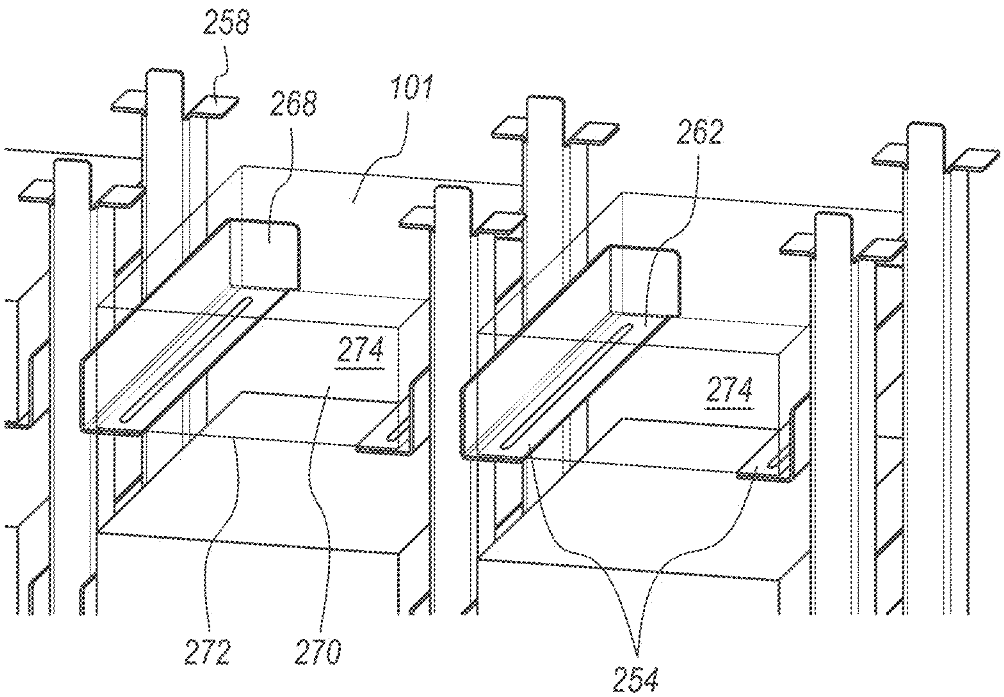

In FIG. 6E, the pallet 262 and the depth adjustment plate 268 are coupled to the vertical column 258 with at least one of a mechanical fastener (not shown) and a slot-in interface (not shown).

The horizontal mounting structure 252 and the vertical mounting structure 256, the pallet 262, and the associated adjustment component are composed of materials selected for durability under sub-zero temperatures. As shown in FIG. 6E, each pallet 262 may include a planar upper surface with a predefined loading zone 274 and having a geometric clearance to facilitate reliable engagement by a retrieval mechanism. The predefined loading zone 274 shares the shelving plane 272, which is defined by two pallets 262 that are each fixedly coupled to different vertical columns 258. Thus, the pallet does not span the entire shelving plane 272. Instead, the pallet 262 only supports the edges of the container 101. Container 101 represents the frozen or refrigerated state prior to engagement with the telescoping fork. Shelf 254 includes a pallet 262 and depth adjustment plate 268, which define the loading zone 274 and shelving plane 272. The depth adjustment plate includes a stopper 269 to prevent over-insertion.

The shelf 254 is located along a depth axis, which may also be referred to as a transverse axis for purposes of this patent. The shelf 254 is modular and reconfigurable and supports container 101, which is frozen or refrigerated as described above. Each shelf supports frozen or refrigerated containers and includes a plurality of pallet openings positioned to align with the horizontal mounting structure 252 and vertical mounting structure 256. Additionally, each shelf 254 may be registered in a coordinate system accessible to a robotic picker, gantry, or telescoping fork for automated container retrieval. Alignment markers or fiducials are located on one or more shelves or mounting structures, the markers configured to assist robotic systems in confirming shelf configuration or container presence.

Various shelves 254 are described in further detail in FIG. 6B through FIG. 6G that includes a pallet, depth adjustment plate, and adjustment openings that in combination can receive different sized containers. Thus, different sized containers can be stored by the dynamic shelving system by adjusting the shelving system to receive the different sized containers.

In another embodiment, the illustrative shelf 254 includes a pallet 262, which is a modular support element that is mountable to a vertical and/or horizontal shelving structure and is configured to partially support the base or side edges of a container. Therefore, a single container may be supported by multiple pallets spaced apart. The pallet 262 may not span the full width or depth of a traditional shelf and may be used in pairs or clusters to hold containers of different sizes and orientations. Additionally, each pallet 262 includes a planar upper surface with a predefined loading zone and geometric clearance margin to facilitate reliable engagement by an automated retrieval mechanism.

As shown in FIG. 6C, the dynamic shelving system 250 includes one or more column width adjustment openings 264 located along the horizontal mounting structure 252 and one or more depth adjustment plate 268 that enable the "depth" spacing to be modified. Note, the depth adjustment plates 268 are spaced between adjacent vertical mounting members 256. For example, the illustrative depth adjustment plate 268 is positioned in discrete increments along the column width adjustment openings 264 to provide adjustable lateral spacing between shelf supports.

Additionally, the dynamic shelving system 250 includes one or more row height adjustment openings 266 that are located along the vertical mounting structure 256. The row height adjustment openings 266 support variable vertical placement of the shelves relative to the support framework.

In another illustrative embodiment, the depth adjustment plate 268 is removably coupled to at least one of pallet 262, the horizontal mounting structure 252, the vertical mounting structure 256, or any combination thereof using a fastener, e.g., a screw, or slot-in interfaces that enable no tools or a low effort install configuration.

The one or more depth adjustment plates 268 are coupled to the pallet 262. The depth adjustment plates 268 selectively vary the distance between a front access face and a rear edge of the pallet 262, which adjusts the depth of the shelving plane. For example, the row height adjustment openings 266 are spaced at uniform intervals along the vertical mounting structure 256 to support adjustable vertical positioning of the shelves 254 in defined increments.

The pallet 262 physically supports the bottom edge or base of a container 101. The pallet 262 is mounted on to the vertical mounting structure 256 with fasteners interfacing with the row height adjustment openings 266 as shown in FIG. 6C. The pallet 262 acts like a partial shelf or ledge. The pallet 262 may include openings or features to attach additional components, like the depth adjustment plate.

The depth adjustment plate 268 defines the limits for the depth axis, i.e., the front-to-back axis which may also be as the axial or transverse axis in this patent. The depth adjustment plate 268 defines or limits the depth of the container placement. The depth adjustment plate 268 may be mounted behind the pallet 262, inserted below or above the pallet 262, attached directly to pallet 262, and other such implementation.

For example, the depth adjustment plate 268 shown in FIG. 6B is a modular component configured to be coupled to the rear portion of the pallet, allowing the effective depth of the pallet to be selectively varied. In a shelving system that includes opposed pallets (e.g., one on each vertical column 258), a container may span across these pallets and rest partially or fully on each.

As used herein, a depth adjustment plate 268 refers to a generally planar component that adjusts or limits the rearward placement of a shelf or pallet. The depth adjustment plate 268 mounted behind or under each pallet serves as a rear stop that limits how far the container can be pushed toward the back of the enclosure. By installing depth adjustment plates 268 at different positions or using plates of different lengths or thicknesses, the system enables customization of the shelf depth to accommodate containers of varying front-to-back dimensions, while still maintaining robotic alignment and retrieval precision.

FIGS. 6C and 6D show more detail of an illustrative depth adjustment plate 268, which is a modular component that can be inserted into the support framework or shelf interface to define a fixed or stepped depth position. The illustrative depth adjustment plate 268 is presented as a position stopper that is used for depth adjustment. Thus, each depth adjustment plate 268 operates as a position stopper that is configured to prevent over-insertion of a container beyond a predefined shelf depth The dynamic shelving system 250 described above maintains structural and thermal integrity under frozen or refrigerated operating conditions and supports automated retrieval of containers via a robotic picker, gantry system, or telescoping fork as described herein. By way of example and not of limitation, the horizontal mounting structure 252 and vertical mounting structures 256, shelves 254, and adjustment components are fabricated from materials selected for durability under sub-zero temperatures, thermal cycling, and condensation exposure.

Figure 6F:
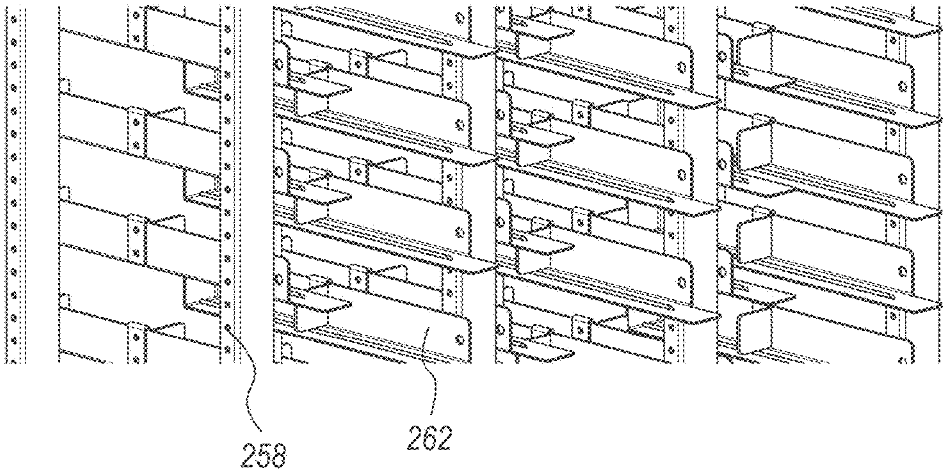

Referring to FIG. 6F, there is shown another view of the height adjustment process for shelf, in which the pallet 262 is fixed with fasteners, e.g., screws, to adjust the shelf height. The spacing may be designed according to various engineering design scenarios. By way of example and not of limitation, the spacing may be 10 mm.

Figure 6G:
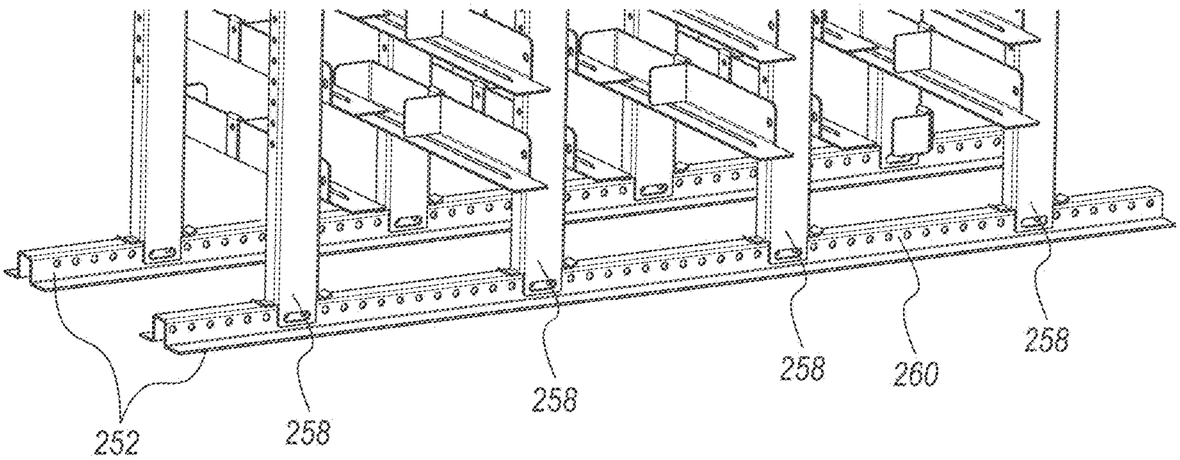

Referring to FIG. 6G, there is shown further detail regarding width adjustment that is enabled with the fixed openings along the horizontal mounting structure 252. The fasteners are received by the fixed openings to fixedly couple the vertical columns 258 to the horizontal column 260.

In operation, the dynamic shelving system 250 described above also supports a method for configuring the dynamic shelving system within a kiosk. The method includes providing a horizontal mounting structure 252 and a vertical mounting structure 256 within a thermally insulated enclosure. The method then proceeds to install one or more shelves 254 onto the mounting structures by aligning pallet openings in each shelf with corresponding openings in the horizontal mounting structure 252 and vertical mounting structure 256 as described above. Each shelf 254 includes a pallet 262 with a depth adjustment plate 268.

In the illustrative embodiment, the depth spacing between vertical mounting members 256 is adjusted by positioning one or more depth adjustment plates 268 along the width adjustment openings 264 located on the horizontal mounting structure 252. A vertical position is selected for each pallet by coupling the pallet 262 to the row height adjustment openings 266 located along the vertical mounting structure 256. The depth of the shelf 254 is modified by installing the depth adjustment plate 268, which selectively defines a rear stop position relative to a front access face of the shelf 254.

The pallet 262 and depth adjustment plate 268 associated with each shelf 254 is secured using mechanical fasteners or slot-in interfaces that enable tool-less or low-effort reconfiguration. The automated retrieval of containers is enabled by aligning the shelf positions with a coordinate system accessible to an illustrative robotic picker, the previously described gantry system, or the previously described telescoping fork.

In one illustrative embodiment for the system and the method, the shelves 254 include one or more drain-through slots or perforations to reduce pooling of condensation or liquid during operation in frozen or refrigerated environments. Additionally, the shelves 254 are individually removed and replaced without disassembling the horizontal or vertical mounting structures.

Another method for configuring an adjustable shelving system for a plurality of frozen or refrigerated containers may include the vertical mounting structure 256 having vertical columns 258 and the horizontal mounting structure 252 having horizontal columns 260. The horizontal adjustment openings 261 associated with the horizontal mounting structure 252 are coupled with the vertical column 258 that includes a column width adjustment opening 264, which causes the vertical mounting column 258 to be fixedly coupled to the horizontal mounting structure 252 when a fastener passes through the horizontal adjustment opening 261 and the column width adjustment opening 264.

The method also includes fitting shelves 254, in which each shelf 254 is configured to support a frozen or refrigerated container, and each shelf includes a pallet 262 and a depth adjustment plate 268. A vertical position for each shelf may be selected based on the size and shape of the container 101. The pallet 262 further includes pallet openings 263 that are positioned to align with at least one vertical column 258. The method modifies the depth of one or more shelves by installing the depth adjustment plate 268 to selectively define a rear stop position relative to a front access face 270 of the shelf. The method secures the pallets 262 and the depth adjustment plates 268 using at least one of a mechanical fastener and slot-in interface.

The method may further provide a plurality of row height adjustment openings 266 disposed along the vertical column 258. The row height adjustment openings 266 support variable vertical placement of the pallet.

Each depth adjustment plate 268 selectively varies the depth of the shelving plane 272. In yet another embodiment, the shelving system maintains structural and thermal integrity under frozen operating conditions. The method may couple the pallet 262 and the depth adjustment plate 268 to the vertical column with at least one of a mechanical fastener and a slot-in interface.

Each depth adjustment plate 268 may include a position stopper 269 that prevents inserting the container 101 beyond a predefined shelf depth. The depth adjustment plate 268 may be positioned in discrete increments along the pallet 262 to provide adjustable depth spacing. Also, the row height adjustment openings 266 may be spaced at uniform intervals along the vertical columns. The row height adjustment openings 266 support adjustable vertical positioning of the pallets in defined increments.

The width, height, and depth adjustments may be performed using standardized shelf and component dimensions compatible with different sized containers. Additionally, the material surrounding the column adjustment openings 264, the row adjustment openings 266, and depth adjustment plate 268 may be visually identified based on a proximate color or label that indicates their applicable configuration range for width, height, or depth. Each shelf 254 may include an anti-slip surface texture or coating to prevent unintended movement of containers during automated retrieval or placement.

The dynamic shelving system and method is configured to integrate with the flexible pickup and transfer fork system and method. As previously described, the flexible pickup and transfer fork system and method has multiple degrees of freedom, a telescoping material selector device, and a multistage transport set of mechanisms that move the altered packages and/or containers. Also, the flexible pickup and transfer fork system and method move the altered packages and/or containers through the various stages that are presented to an individual in a kiosk embodiment, or to another robot in a production or manufacturing embodiment.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

The invention claimed is:

1. A dynamic shelving system for use within a refrigerated or frozen kiosk environment, the shelving system comprising:

a horizontal mounting structure and a vertical mounting structure that provide an adjustable support framework within a thermally insulated enclosure, wherein the vertical mounting structure includes a plurality of vertical columns and the horizontal mounting structure includes a plurality of horizontal columns;

each shelf supports a frozen or refrigerated container, and each shelf includes a pallet and a depth adjustment plate wherein the pallet further includes a plurality of pallet openings that are positioned to align with at least one vertical column;

a plurality of horizontal adjustment openings associated with the horizontal mounting structure, wherein each of the vertical columns includes a column width adjustment opening that causes the vertical columns to be fixedly coupled to the horizontal mounting structure when a fastener passes through the horizontal adjustment opening and the column width adjustment opening;

a plurality of row height adjustment openings disposed along the vertical column, wherein the row height adjustment openings supports variable vertical placement of the pallet;

each depth adjustment plate selectively varies the depth of a shelving plane; and wherein the shelving system maintains structural and thermal integrity under frozen operating conditions.

2. The shelving system of claim 1, wherein each depth adjustment plate is positioned in discrete increments along the pallet to provide adjustable depth spacing.

3. The shelving system of claim 1, wherein the row height adjustment openings are spaced at uniform intervals along the vertical columns, and wherein the row height adjustment openings support adjustable vertical positioning of the pallets in defined increments.

4. The shelving system of claim 1, wherein each depth adjustment plate includes a position stopper that prevents inserting the container beyond a predefined shelf depth.

5. The shelving system of claim 1, wherein the pallet and the depth adjustment plate are coupled to the vertical columns with at least one of a mechanical fastener and a slot-in interface.

6. The shelving system of claim 1, wherein the horizontal mounting structure and the vertical mounting structure, the pallet, and the associated adjustment component are composed of materials selected for durability under sub-zero temperatures.

7. The shelving system of claim 1, wherein each pallet includes a planar upper surface with a predefined loading zone and having a geometric clearance to facilitate reliable engagement by a retrieval mechanism.

8. A dynamic shelving system for use within a kiosk, the shelving system comprising:

a horizontal mounting structure and a vertical mounting structure that provide an adjustable support framework within a thermally insulated enclosure, wherein the vertical mounting structure includes a plurality of vertical columns and the horizontal mounting structure includes a plurality of horizontal columns;

each shelf supports a frozen or refrigerated container, and each shelf includes a pallet and a depth adjustment plate wherein the pallet further includes a plurality of pallet openings that are positioned to align with at least one vertical column;

a plurality of horizontal adjustment openings associated with the horizontal mounting structure, wherein each of the vertical columns includes a column width adjustment opening that causes the vertical columns to be fixedly coupled to the horizontal mounting structure when a fastener passes through the horizontal adjustment opening and the column width adjustment opening;

a plurality of row height adjustment openings disposed along the vertical column, wherein the row height adjustment openings supports variable vertical placement of the pallet;

each depth adjustment plate selectively varies the depth of a shelving plane;

wherein the shelving system maintains structural and thermal integrity under frozen operating conditions;

wherein the plurality of pallets and associated plurality of depth adjustment plates are coupled to the vertical column using at least one or a plurality of mechanical fasteners and a plurality of slot-in interfaces; and wherein each pallet includes a planar upper surface with a predefined loading zone and having a geometric clearance to facilitate reliable engagement by a retrieval mechanism.

9. The shelving system of claim 8, wherein each depth adjustment plate is positioned in discrete increments along the pallet to provide adjustable depth spacing.

10. The shelving system of claim 8, wherein the row height adjustment openings are spaced at uniform intervals along the vertical columns, and wherein the row height adjustment openings support adjustable vertical positioning of the pallets in defined increments.

11. The shelving system of claim 8, wherein each depth adjustment plate includes a position stopper that prevents inserting the container beyond a predefined shelf depth.

12. The shelving system of claim 8, wherein the horizontal mounting structure and the vertical mounting structure, the pallet, and the associated adjustment component are composed of materials selected for durability under sub-zero temperatures.

13. A method for configuring an adjustable shelving system for a plurality of frozen or refrigerated containers, the method comprising, providing a horizontal mounting structure and a vertical mounting structure that provide an adjustable support framework within a thermally insulated enclosure, wherein the vertical mounting structure includes a plurality of vertical columns and the horizontal mounting structure includes a plurality of horizontal columns;

coupling a plurality of horizontal adjustment openings associated with the horizontal mounting structure with a plurality of vertical columns that includes a column width adjustment opening that causes the vertical column to be fixedly coupled to the horizontal mounting structure when a fastener passes through the horizontal adjustment opening and the column width adjustment opening;

installing a plurality of shelves, in which each shelf supports a frozen or refrigerated container, and each shelf includes a pallet and a depth adjustment plate;

selecting a vertical position for each shelf, wherein the pallet further includes a plurality of pallet openings that are positioned to align with at least one of the vertical columns;

modifying the depth of one or more shelves by installing the depth adjustment plate to selectively define a rear stop position relative to a front access face of the shelf; and securing the pallets and the depth adjustment plates using at least one of a mechanical fastener and slot-in interface.

14. The method of claim 13 further comprising providing a plurality of row height adjustment openings disposed along the vertical columns, wherein the row height adjustment openings supports variable vertical placement of the pallet.

15. The method of claim 14 wherein each depth adjustment plate selectively varies the depth of the shelving plane.

16. The method of claim 15 wherein the shelving system maintains structural and thermal integrity under frozen operating conditions.

17. The method of claim 16, coupling the pallet and the depth adjustment plate are to the vertical columns with at least one of a mechanical fastener and a slot-in interface.

18. The method of claim 17, wherein each depth adjustment plate includes a position stopper that prevents inserting the container beyond a predefined shelf depth.

19. The method of claim 18, wherein each depth adjustment plate is positioned in discrete increments along the pallet to provide adjustable depth spacing.

20. The method of claim 18, wherein the row height adjustment openings are spaced at uniform intervals along the vertical columns, and wherein the row height adjustment openings support adjustable vertical positioning of the pallets in defined increments.

* * * * *